(12) United States Patent
Takeda et al.

(10) Patent No.: US 12,421,569 B2
(45) Date of Patent: Sep. 23, 2025

(54) STEEL SHEET AND METHOD FOR PRODUCING SAME

(71) Applicant: NIPPON STEEL CORPORATION, Tokyo (JP)

(72) Inventors: Kengo Takeda, Tokyo (JP); Katsuya Nakano, Tokyo (JP); Yuya Suzuki, Tokyo (JP); Eriko Tsukamoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 525 days.

(21) Appl. No.: 17/923,468

(22) PCT Filed: Jun. 3, 2021

(86) PCT No.: PCT/JP2021/021249
§ 371 (c)(1),
(2) Date: Nov. 4, 2022

(87) PCT Pub. No.: WO2021/251275
PCT Pub. Date: Dec. 16, 2021

(65) Prior Publication Data
US 2023/0183833 A1 Jun. 15, 2023

(30) Foreign Application Priority Data
Jun. 8, 2020 (JP) ................. 2020-099296

(51) Int. Cl.
| | | |
|---|---|---|
| *C21D 9/46* | (2006.01) | |
| *B21C 47/02* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/14* | (2006.01) | |
| *C23C 2/06* | (2006.01) | |
| *C23C 2/12* | (2006.01) | |
| *C23C 2/40* | (2006.01) | |
| *C23G 1/08* | (2006.01) | |

(52) U.S. Cl.
CPC ............... *C21D 9/46* (2013.01); *B21C 47/02* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *C23C 2/06* (2013.01); *C23C 2/12* (2013.01); *C23C 2/40* (2013.01); *C23G 1/08* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
None
See application file for complete search history.

(56) References Cited

U.S. PATENT DOCUMENTS

| | | |
|---|---|---|
| 7,879,160 B2 | 2/2011 | Sun |
| 2019/0071744 A1 | 3/2019 | Hasegawa et al. |
| 2021/0062288 A1 | 3/2021 | Nishio et al. |

FOREIGN PATENT DOCUMENTS

| | | |
|---|---|---|
| EP | 0 796 928 A1 | 9/1997 |
| JP | 2013-60630 A | 4/2013 |
| JP | 2018-90894 A | 6/2018 |
| JP | 2019-35111 A | 3/2019 |
| WO | WO 2019/181950 A1 | 9/2019 |

*Primary Examiner* — Jenny R Wu
(74) *Attorney, Agent, or Firm* — Birch, Stewart, Kolasch & Birch, LLP

(57) ABSTRACT

Provided is a steel sheet having a predetermined chemical composition, wherein precipitates having a diameter of less than 0.1 μm are present in a number density of 10 to 200/μm² in a depth region of 1 to 10 μm from a surface, an amount of dissolved C in a depth region of 10 to 60 μm from the surface is less than 0.20 mass %, and a tensile strength is 1200 MPa or more. Further, provided is a method for producing a steel sheet comprising a step of hot rolling a steel slab having a predetermined chemical composition, then coiling it at 580° C. or less, a step of pickling the hot rolled steel sheet to remove oxide scale and remove the surface layer of the hot rolled steel sheet down to at least 5 μm, and a step of cold rolling the hot rolled steel sheet, then holding it in an atmosphere of a dew point of −20 to 20° C. at a temperature region of 200 to 400° C. for 20 to 180 seconds and holding it at a temperature region of 740 to 900° C. for 40 to 300 seconds.

7 Claims, No Drawings

STEEL SHEET AND METHOD FOR PRODUCING SAME

FIELD

The present invention relates to a steel sheet high in strength and excellent in weldability and a method for producing the same.

When using a spot welder to weld galvanized steel sheet, sometimes the melted zinc causes the steel sheet to crack. Such a crack is called an "LME crack (liquid metal embrittlement crack)" and occurs due to molten zinc penetrating to the inside of the steel sheet along the grain boundaries of the steel.

Up until now, numerous inventions have been disclosed relating to DP steel (dual phase steel) and high strength steel sheet, but among them, there have been few examples of disclosures of art relating to the suppression of spot welding LME cracks. (For example, see PTLs 1 to 3.)

PTL 1 discloses a steel member provided with a surface layer and a first martensite layer arranged at a layer below the surface layer and having a concentration of nitrogen element of 0.2 to 1.0 mass %, the surface layer having at least one of any of lithium-iron composite oxides, FeO, and $Fe_3O_4$ as a main constituent and containing at least one selected from the group consisting of dissolved silicon, silicon oxides, and silicon nitrides, the first martensite layer including an area ratio of 30% or less of γ phases and an area ratio of 10% or less of ε phases. In PTL 1, the scope of disclosure is limited to art advantageous to increasing strength by high frequency heating hardening. Art of improving weldability is not disclosed.

PTL 2 discloses a method of producing a hot rolled steel sheet comprising hot rolling a slab having a chemical composition containing, by mass %, C: 0.05 to 0.25%, Si: 1.0% or less, Mn: 2.0 to 4.0%, P: 0.100% or less, S: 0.02% or less, Al: 1.0% or less, N: 0.001 to 0.015%, and one or more selected from Ti: 0.003 to 0.030%, Nb: 0.010 to 0.050%, and Mo: 0.005 to 0.100% and a balance of Fe and unavoidable impurities during which, in the finish rolling, making the temperature from the second pass counting back from the final pass to the final pass 800 to 950° C., making the cumulative rolling reduction from the second pass counting back from the final pass to the final pass 10 to 40%, making the rolling reduction of the final pass 8 to 25%, starting cooling at 0.5 to 3.0 s after the end of final rolling, cooling in the temperature region of 600 to 720° C. by an average cooling rate of 30° C./s or more, and coiling at 590° C. or less. However, PTL 2 does not in any way disclose the art of suppressing LME.

PTL 3 discloses a high strength steel sheet containing, by mass %, C: 0.075% to 0.350%, Si: 0.30% to 2.50%, Mn: 1.20% to 3.50%, P: 0.001% to 0.100%, S: 0.0001% to 0.0100%, Al: 0.005% to 2.500%, and N: 0.0001% to 0.0100% and a balance of iron and unavoidable impurities, wherein a region, in which oxide particles containing Si and/or Mn and having a particle size of 20 nm or more are dispersed at an average distance between particles of 2.5 μm or less, is present in a range of an average depth from the surface of 0.3 μm to 15 μm, an average particle size of oxide particles in the region is 0.3 μm or less, and an average hardness at a location of a depth from the interface with the region of 30 μm is Hv250 or more. However, PTL 3 does not disclose the art of suppressing LME.

CITATION LIST

Patent Literature

[PTL 1] Japanese Unexamined Patent Publication No. 2019-35111
[PTL 2] Japanese Unexamined Patent Publication No. 2018-90894
[PTL 3] Japanese Unexamined Patent Publication No. 2013-60630

SUMMARY

Technical Problem

The present invention, in consideration of the above situation, has as its object the provision of a steel sheet high in strength and excellent in weldability and a method for producing the same.

Solution to Problem

The inventors engaged in intensive research on the solution to the above problem and clarified that "strain" has a great effect on the occurrence of LME cracks. For example, even in the same current application cycle (heat history), LME cracks remarkably occur if spot welding so as to increase the amount of plastic deformation of steel sheet. It is believed that the reason why LME cracks more easily occur along with an increase in "strain" is that "penetration of molten zinc to the inside of the steel sheet" as stated above more easily occurs. Therefore, by preventing an increase of strain at the surface layer of the steel sheet, it becomes possible to suppress the occurrence of spot welding LME cracks. The inventors discovered the method of imparting a difference in strength in a thickness direction so as to prevent an increase in strain at the surface layer of steel sheet. Specifically, they strongly controlled the surface-most layer (first depth region) by precipitation strengthening, imparted a soft layer (second depth region) reduced in concentration of carbon at the inside of the thickness of the hard surface-most layer, and provided a layer (third depth region) harder than this soft layer at the further inside of the thickness. By providing this three-layer structure with a gradient of characteristics from the surface layer of thickness toward the center layer of thickness, the soft layer (second depth region) receives the strain when receiving deformation and excessive increase of the strain at the surface-most layer (first depth region) can be suppressed.

Further, the inventors learned through an accumulation of various research that steel sheet of a layer structure having such a suitable difference in hardness in the thickness direction is difficult to produce if just slightly changing the hot rolling conditions, annealing conditions, etc., and can only be produced by optimizing the conditions in the integrated steps of the hot rolling and annealing steps, etc., and thereby completed the present invention.

The gist of the present invention is as follows.

(1) A steel sheet having a chemical composition comprising, by mass %,
C: 0.20 to 0.40%,
Si: 0.01 to 2.00%,
Mn: 0.10% to 4.00%,
P: 0.0200% or less,
S: 0.0200% or less,
Al: 1.500% or less,
N: 0.0200% or less, Ti: 0.005 to 0.500%,
Co: 0 to 0.5000%,
Ni: 0 to 1.0000%,
Mo: 0 to 1.0000%,
Cr: 0 to 2.0000%,
O: 0 to 0.0200%,
B: 0 to 0.0100%,
Nb: 0 to 0.5000%,
V: 0 to 0.5000%,
Cu: 0 to 0.5000%,
W: 0 to 0.1000%,
Ta: 0 to 0.1000%,
Sn: 0 to 0.0500%,
Sb: 0 to 0.0500%,
As: 0 to 0.0500%,
Mg: 0 to 0.0500%,
Ca: 0 to 0.0500%,
Y: 0 to 0.0500%,
Zr: 0 to 0.0500%,
La: 0 to 0.0500%,
Ce: 0 to 0.0500%, and
a balance of Fe and impurities,
wherein precipitates having a diameter of less than 0.1 μm are present in a number density of 10 to 200/μm$^2$ in a depth region of 1 to 10 μm from a surface,
an amount of dissolved C in a depth region of 10 to 60 μm from the surface is less than 0.20 mass %, and
a tensile strength is 1200 MPa or more.

(2) The steel sheet according to the above (1) wherein the chemical composition comprises, by mass %, one or more selected from the group consisting of
Co: 0.0001 to 0.5000%,
Ni: 0.0001 to 1.0000%,
Mo: 0.0001 to 1.0000%,
Cr: 0.0001 to 2.0000%,
O: 0.0001 to 0.0200%,
B: 0.0001 to 0.0100%,
Nb: 0.0001 to 0.5000%,
V: 0.0001 to 0.5000%,
Cu: 0.0001 to 0.5000%,
W: 0.0001 to 0.1000%,
Ta: 0.0001 to 0.1000%,
Sn: 0.0001 to 0.0500%,
Sb: 0.0001 to 0.0500%,
As: 0.0001 to 0.0500%,
Mg: 0.0001 to 0.0500%,
Ca: 0.0001 to 0.0500%,
Y: 0.0001 to 0.0500%,
Zr: 0.0001 to 0.0500%,
La: 0.0001 to 0.0500%, and
Ce: 0.0001 to 0.0500%.

(3) The steel sheet according to the above (1) or (2), wherein a plating layer containing zinc, aluminum, magnesium, an alloy consisting of any combination thereof, or an alloy of at least one of these elements and iron is formed on at least one surface of the steel sheet.

(4) A method for producing a steel sheet comprising
a step of hot rolling a steel slab having a chemical composition according to the above (1) or (2), then coiling it at 580° C. or less,
a step of pickling the obtained hot rolled steel sheet to remove oxide scale present on the surface of the hot rolled steel sheet and remove the surface layer of the hot rolled steel sheet down to at least 5 μm, and
a step of cold rolling the hot rolled steel sheet, then annealing it, wherein the annealing comprises holding the obtained cold rolled steel sheet in an atmosphere of a dew point of −20 to 20° C. at a temperature region of 200 to 400° C. for 20 to 180 seconds, then holding it in an atmosphere of a dew point of −20 to 20° C. at a temperature region of 740 to 900° C. for 45 to 300 seconds.

(5) The method for producing the steel sheet according to the above (4), wherein, in the annealing, a plating layer containing zinc, aluminum, magnesium, an alloy consisting of any combination thereof, or an alloy of at least one of these elements and iron is formed on at least one surface of the cold rolled steel sheet.

Advantageous Effects of Invention

According to the present invention, it is possible to provide steel sheet high in strength and excellent in weldability and a method for producing the same.

DESCRIPTION OF EMBODIMENTS

Below, embodiments of the present invention will be explained. These explanations are intended to simply illustrate the embodiments of the present invention. The present invention is not limited to the following embodiments.
<Steel Sheet>
The steel sheet according to an embodiment of the present invention has a chemical composition comprising, by mass %,
C: 0.20 to 0.40%,
Si: 0.01 to 2.00%,
Mn: 0.10% to 4.00%,
P: 0.0200% or less,
S: 0.0200% or less,
Al: 1.500% or less,
N: 0.0200% or less,
Ti: 0.005 to 0.500%,
Co: 0 to 0.5000%,
Ni: 0 to 1.0000%,
Mo: 0 to 1.0000%,
Cr: 0 to 2.0000%,
O: 0 to 0.0200%,
B: 0 to 0.0100%,
Nb: 0 to 0.5000%,
V: 0 to 0.5000%,
Cu: 0 to 0.5000%,
W: 0 to 0.1000%,
Ta: 0 to 0.1000%,
Sn: 0 to 0.0500%,
Sb: 0 to 0.0500%,
As: 0 to 0.0500%,
Mg: 0 to 0.0500%,
Ca: 0 to 0.0500%,
Y: 0 to 0.0500%,
Zr: 0 to 0.0500%,
La: 0 to 0.0500%,
Ce: 0 to 0.0500%, and
a balance of Fe and impurities,
wherein precipitates having a diameter of less than 0.1 μm are present in a number density of 10 to 200/μm$^2$ in a depth region of 1 to 10 μm from a surface,
an amount of dissolved C in a depth region of 10 to 60 μm from the surface is less than 0.20 mass %, and
a tensile strength is 1200 MPa or more.

First, the reasons for limiting the chemical composition of the steel sheet according to an embodiment of the present invention will be explained. The "%" of the constituents here means mass %. Further, in this Description, the "to" showing a range of numerical values is used in the sense including the numerical values before and after it as lower limit values and upper limit values unless otherwise indicated.

(C: 0.20 to 0.40%)

C is an element making the tensile strength increase inexpensively and is an extremely important element for control of the strength of the steel. To sufficiently obtain such an effect, the C content is 0.20% or more. The C content may also be 0.22% or more, 0.25% or more, or 0.28% or more. On the other hand, if excessively including C, sometimes the occurrence of LME is promoted. For this reason, the C content is 0.40% or less. The C content may also be 0.38% or less, 0.36% or less, or 0.34% or less.

(Si: 0.01 to 2.00%)

Si is an element acting as a deoxidizer and suppressing the precipitation of carbides in a cooling process during cold rolled annealing. To sufficiently obtain such an effect, the Si content is 0.01% or more. The Si content may also be 0.10% or more, 0.30% or more, or 0.80% or more. On the other hand, if excessively including Si, an increase in the steel strength and a drop in the elongation are invited and further sometimes cracking of the steel sheet by LME at the time of spot welding is invited. For this reason, the Si content is 2.00% or less. The Si content may also be 1.80% or less, 1.50% or less, or 1.20% or less.

(Mn: 0.10 to 4.00%)

Mn is a factor affecting the ferrite transformation of steel and is an element effective for raising the strength. To sufficiently obtain such an effect, the Mn content is 0.10% or more. The Mn content may also be 0.50% or more, 1.00% or more, or 1.50% or more. On the other hand, if excessively including Mn, an increase in the steel strength and a drop in the elongation are invited and sometimes cracking of the steel sheet due to LME at the time of spot welding is invited. For this reason, the Mn content is 4.00% or less. The Mn content may also be 3.30% or less, 3.00% or less, or 2.70% or less.

(P: 0.0200% or Less)

P is an element strongly segregating at the ferrite grain boundaries and prompting embrittlement of the grain boundaries. The P content is preferably as small as possible, therefore ideally is 0%. However, excessive reduction of the P content would invite a major increase in costs, therefore the P content may also be 0.0001% or more and may be 0.0010% or more or 0.0050% or more. On the other hand, if excessively including P, embrittlement of the steel is invited and further sometimes cracking of the steel sheet due to LME is invited. For this reason, the P content is 0.0200% or less. The P content may also be 0.0180% or less, 0.0150% or less, or 0.0100% or less.

(S: 0.0200% or Less)

S is an element forming MnS and other nonmetallic inclusions in the steel and inviting a drop in ductility of steel parts. The S content is preferably as small as possible, therefore ideally is 0%. However, excessive reduction of the S content would invite a major increase in costs, therefore the S content may also be 0.0001% or more and may be 0.0002% or more, 0.0010% or more, or 0.0050% or more. On the other hand, if excessively including S, occurrence of cracks starting from nonmetallic inclusions at the time of cold forming is invited and further sometimes cracking of the steel sheet due to LME at the time of spot welding is invited. For this reason, the S content is 0.0200% or less. The S content may also be 0.0180% or less, 0.0150% or less, or 0.0100% or less.

(Al: 1.500% or Less)

Al is an element acting as a deoxidizer of steel and stabilizing ferrite and may be included in accordance with need. Al need not be included, therefore the lower limit of the Al content is 0%. To sufficiently obtain this effect, the Al content is preferably 0.001% or more and may also be 0.010% or more, 0.050% or more, or 0.100% or more. On the other hand, if excessively including Al, ferrite transformation and bainite transformation are excessively promoted in the cooling process in cold rolled annealing, therefore the strength of the steel sheet sometimes falls. For this reason, the Al content is 1.500% or less. The Al content may also be 1.400% or less, 1.200% or less, or 1.000% or less.

(N: 0.0200% or Less)

N is an element forming coarse nitrides in the steel sheet and causing a drop in the workability of the steel sheet. Further, N is an element becoming a cause of formation of blow holes at the time of welding. The N content is preferably as small as possible, therefore ideally is 0%. However, excessive reduction of the N content would invite a major increase in production costs, therefore the N may be 0.0001% or more and may be 0.0005% or more, 0.0010% or more, or 0.0050% or more. On the other hand, if excessively including N, it will bond with Ti to form large amounts of TiN, therefore the amount of dissolved Ti in the steel sheet will become smaller and sometimes it will become no longer possible to control the formation of precipitates (for example, Ti oxides) at the steel sheet surface layer. Therefore, the N content is 0.0200% or less. The N content may be 0.0150% or less, 0.0100% or less, or 0.0080% or less.

(Ti: 0.005% to 0.500%)

Ti is an element required for bonding with the oxygen penetrating the surface layer of the steel from the annealing atmosphere and forming fine precipitates at the steel sheet surface layer (for example, Ti oxides) in the steps of heating and soaking in the cold rolled annealing. To make the precipitate sufficiently form, the Ti content is 0.005% or more. The Ti content may also be 0.010% or more, 0.050% or more, 0.100% or more, or 0.150% or more. On the other hand, if excessively containing Ti, sometimes excessive formation of precipitates is caused or ferrite transformation is promoted and a drop in strength is caused in the cooling process during the cold rolled annealing. For this reason, the Ti content is 0.500% or less. The Ti content may also be 0.450% or less, 0.400% or less, 0.350% or less, or 0.300% or less.

The basic chemical composition of the steel sheet in the present embodiment is as explained above. Furthermore, the steel sheet in the present embodiment may contain at least one element among the following optional elements in place of part of the balance of Fe in accordance with need. These elements need not be included, therefore the lower limits are 0%.

(Co: 0 to 0.5000%)

Co is an element effective for control of the morphology of the carbides and increase of strength and may be included for control of the dissolved carbon in accordance with need. To sufficiently obtain these effects, the Co content is preferably 0.0001% or more. The Co content may also be 0.0010% or more, 0.0100% or more, or 0.0400% or more. On the other hand, if excessively including Co, a large amount of fine Co carbides precipitate and sometimes an excessive rise of the strength of the steel material and/or a drop in the ductility is invited. For this reason, the Co content is preferably 0.5000% or less. The Co content may also be 0.4000% or less, 0.3000% or less, or 0.2000% or less.

(Ni: 0 to 1.0000%)

Ni is a strengthening element and is effective for improvement of the hardenability. In addition, it improves the wettability and promotes an alloying reaction, therefore may be included in accordance with need. To sufficiently obtain these effects, the Ni content is preferably 0.0001% or more. The Ni content may also be 0.0010% or more, 0.0100% or more, or 0.0500% or more. On the other hand, if excessively including Ni, it sometimes has a detrimental effect on the productivity at the time of production and hot rolling and causes a drop in the elongation. For this reason, the Ni content is preferably 1.0000% or less. The Ni content may also be 0.9000% or less, 0.5000% or less, or 0.200% or less.

(Mo: 0 to 1.0000%)

Mo is an element effective for improving the strength of steel sheet. Further, Mo is an element having the effect of inhibiting the ferrite transformation which occurs at the time of heat treatment in continuous annealing facilities or continuous hot dip galvanization facilities. To sufficiently obtain these effects, the Mo content is preferably 0.0001% or more. The Mo content may also be 0.0010% or more, 0.0100% or more, or 0.0500% or more. On the other hand, if excessively including Mo, a large amount of fine Mo carbides precipitates and sometimes invite an excessive rise in strength of the steel material and/or a drop in ductility. For this reason, the Mo content is preferably 1.0000% or less. The Mo content may also be 0.9000% or less, 0.8000% or less, or 0.700% or less.

(Cr: 0 to 2.0000%)

Cr, like Mn, is an element suppressing pearlite transformation and effective for increasing the strength of steel and may be included as needed. To sufficiently obtain such an effect, the Cr content is preferably 0.0001% or more. The Cr content may also be 0.0010% or more, 0.0100% or more, or 0.0500% or more. On the other hand, if excessively including Cr, this sometimes invites an excessive rise in strength of the steel material and/or a drop in ductility. For this reason, the Cr content is preferably 2.0000% or less. The Cr content may also be 1.7000% or less, 1.5000% or less, or 1.000% or less.

(O: 0 to 0.0200%)

O forms oxides and causes the workability to deteriorate, therefore has to be kept down in content. In particular, oxides are often present as inclusions. If present at the stamped end faces or cut surfaces, they form notch like defects and coarse dimples at the end faces, therefore invite stress concentration at the time of stretch forming and strong working. These become starting points of crack formation and cause a major deterioration of the workability. For this reason, the O content may also be 0%, but excessive reduction invites a major increase in costs and is not economically preferable. For this reason, the O content is preferably 0.0001% or more. The O content may also be 0.0005% or more, 0.0010% or more, or 0.0015% or more. On the other hand, if excessively including O, the above tendency becomes remarkable. In addition, sometimes excessive formation of precipitates is caused. For this reason, the O content is preferably 0.0200% or less. The O content may also be 0.0150% or less, 0.0100% or less, or 0.0050% or less.

(B: 0 to 0.0100%)

B is an element suppressing the formation of ferrite and pearlite in the cooling process from austenite and promotes the formation of bainite or martensite and other low temperature transformed structures. Further, B is an element beneficial for increasing the strength of steel and may be included as needed. However, if the B content is too low, sometimes the effect of increasing the strength and other improvements are not sufficiently obtained. Furthermore, identification of less than 0.0001% requires careful attention in analysis. Depending on the analytical apparatus, the lower limit of detection will be reached. For this reason, the B content is preferably 0.0001% or more. The B content may also be 0.0005% or more, 0.0010% or more, or 0.0015% or more. On the other hand, if excessively including B, formation of coarse B oxides in the steel is invited. These become starting points of formation of voids at the time of cold forming, whereby the hole expandability and other cold workability sometimes deteriorate. For this reason, the B content is preferably 0.0100% or less. The B content may also be 0.0080% or less, 0.0060% or less, or 0.0040% or less.

(Nb: 0 to 0.5000%)

Nb is an element effective for control of the morphology of carbides and an element also effective for improving the toughness since its addition refines the structure. To sufficiently obtain these effects, the Nb content is preferably 0.0001% or more. The Nb content may also be 0.0010% or more, 0.0100% or more, or 0.0200% or more. On the other hand, if excessively including Nb, a large number of fine, hard Nb carbides precipitate and invite remarkable deterioration of the ductility and sometimes cause a drop in the cold workability other cold workability. For this reason, the Nb content is preferably 0.5000% or less. The Nb content may also be 0.4000% or less, 0.2000% or less, or 0.1000% or less.

(V: 0 to 0.5000%)

V is a strengthening element and contributes to a rise in strength of the steel sheet by precipitation strengthening, fine grain strengthening by inhibiting growth of crystal grains, and dislocation strengthening through inhibiting recrystallization. To sufficiently obtain such an effect, the V content is preferably 0.0001% or more. The V content may also be 0.0010% or more, 0.0100% or more, or 0.0200% or more. On the other hand, if excessively including V, the precipitation of carbonitrides becomes greater and sometimes the hole expandability and other cold workability deteriorate. For this reason, the V content is preferably 0.5000% or less. The V content may also be 0.4000% or less, 0.2000% or less, or 0.1000% or less.

(Cu: 0 to 0.5000%)

Cu is an element effective for improvement of the strength of the steel sheet. To sufficiently obtain such an effect, the Cu content is preferably 0.0001% or more. The Cu content may also be 0.0010% or more, 0.0100% or more, or 0.0200% or more. On the other hand, if excessively including Cu, during the hot rolling, the steel material becomes brittle and sometimes hot rolling becomes impossible. Furthermore, the strength of the steel remarkably rises and sometimes the hole expandability and other cold workability deteriorates. For this reason, the Cu content is preferably 0.5000% or less. The Cu content may also be 0.4000% or less, 0.2000% or less, or 0.1000% or less.

(W: 0 to 0.1000%)

W is effective for raising the strength of the steel sheet and is an extremely important element since precipitates and crystals containing W become hydrogen trapping sites. To sufficiently obtain these effects, the W content is preferably 0.0001% or more. The W content may also be 0.0010% or more, 0.0050% or more, or 0.0100% or more. On the other hand, if excessively including W, the workability sometimes falls. For this reason, the W content is preferably 0.1000% or less. The W content may also be 0.0800% or less, 0.0600% or less, or 0.0400% or less.

(Ta: 0 to 0.1000%)

Ta, like Co, is an element effective for control of the morphology of the carbides and increase of strength and may be included in accordance with need. To sufficiently obtain these effects, the Ta content is preferably 0.0001% or more. The Ta content may also be 0.0010% or more, 0.0050% or more, or 0.0100% or more. On the other hand, if excessively including Ta, a large number of fine Ta carbides precipitate and sometimes a rise in strength of the steel sheet and drop in ductility are invited and the hole expandability and other cold workability are made to drop. For this reason, the Ta content is preferably 0.1000% or less. The Ta content may also be 0.0800% or less, 0.0600% or less, or 0.0400% or less.

(Sn: 0 to 0.0500%)

Sn is an element included in steel when using scrap as a raw material. The less the better. Therefore, the Sn content may also be 0%, but excessive reduction invites an increase in refining costs. For this reason, the Sn content is preferably 0.0001% or more. The Sn content may also be 0.0005% or more, 0.0010% or more, or 0.0020% or more. On the other hand, if excessively including Sn, sometimes a drop in hole expandability and other cold workability is caused due to embrittlement of the ferrite. For this reason, the Sn content is preferably 0.0500% or less. The Sn content may also be 0.0400% or less, 0.0200% or less, or 0.0100% or less.

(Sb: 0 to 0.0500%)

Sb, like Sn, is an element included when using scrap as a steel raw material. Sb strongly segregates at the grain boundaries and invites embrittlement of the grain boundaries and a drop in ductility, therefore the less the better. 0% is also possible. However, excessive reduction invites an increase in refining costs. For this reason, the Sb content is preferably 0.0001% or more. The Sb content may also be 0.0005% or more, 0.0010% or more, or 0.0020% or more. On the other hand, if excessively including Sb, sometimes a drop in the hole expandability and other cold workability is caused. For this reason, the Sb content is preferably 0.0500% or less. The Sb content may also be 0.0400% or less, 0.0200% or less, or 0.0100% or less.

(As: 0 to 0.0500%)

As, like Sn and Sb, is an element included when using scrap as a steel raw material. It is an element which strongly segregates at the grain boundaries. The less the better. Therefore, the As content may be 0%, but excessive reduction invites an increase in the refining costs. For this reason, the As content is preferably 0.0001% or more. The As content may also be 0.0005% or more, 0.0010% or more, or 0.0020% or more. On the other hand, if excessively including As, a drop in cold workability is sometimes invited. For this reason, the As content is preferably 0.0500% or less. The As content may also be 0.0400% or less, 0.0300% or less, or 0.0200% or less.

(Mg: 0 to 0.0500%)

Mg is an element enabling control of the morphology of sulfides with trace addition and may be included in accordance with need. To sufficiently obtain such an effect, the Mg content is preferably 0.0001% or more. The Mg content may also be 0.0005% or more, 0.0010% or more, or 0.0020% or more. On the other hand, if excessively including Mg, sometimes a drop in the hole expandability and other cold workability is caused due to the formation of coarse inclusions. For this reason, the Mg content is preferably 0.0500% or less. Mg content may also be 0.0400% or less, 0.0300% or less, or 0.0200% or less.

(Ca: 0 to 0.0500%) Ca is useful as a deoxidizing element and also has an effect on control of the morphology of sulfides. To sufficiently obtain these effects, the Ca content is preferably 0.0001% or more. The Ca content may also be 0.0005% or more, 0.0010% or more, or 0.0020% or more. On the other hand, if excessively including Ca, sometimes the hole expandability and other cold workability deteriorate. For this reason, the Ca content is preferably 0.0500% or less. The Ca content may also be 0.0400% or less, 0.0300% or less, or 0.0200% or less.

(Y: 0 to 0.0500%)

Y, like Mg and Ca, is an element enabling control of the morphology of sulfides with trace addition and may be included in accordance with need. To sufficiently obtain such an effect, the Y content is preferably 0.0001% or more. The Y content may also be 0.0005% or more, 0.0010% or more, or 0.0020% or more. On the other hand, if excessively including Y, coarse Y oxides are formed and sometimes the hole expandability and other cold workability fall. For this reason, the Y content is preferably 0.0500% or less. The Y content may also be 0.0400% or less, 0.0300% or less, or 0.0200% or less.

(Zr: 0 to 0.0500%)

Zr, like Mg, Ca, and Y, is an element enabling control of the morphology of sulfides with trace addition and may be included in accordance with need. To sufficiently obtain such an effect, the Zr content is preferably 0.0001% or more. The Zr content may also be 0.0005% or more, 0.0010% or more, or 0.0020% or more. On the other hand, if excessively including Zr, coarse Zr oxides are formed and sometimes the hole expandability and other cold workability fall. For this reason, the Zr content is preferably 0.0500% or less. The Zr content may also be 0.0400% or less, 0.0300% or less, or 0.0200% or less.

(La: 0 to 0.0500%)

La is an element enabling control of the morphology of sulfides with trace addition and may be included in accordance with need. To sufficiently obtain such an effect, the La content is preferably 0.0001% or more. The La content may also be 0.0005% or more, 0.0010% or more, or 0.0020% or more. On the other hand, if excessively including La, La oxides are formed and a drop in hole expandability and other cold workability is sometimes invited. For this reason, the La content is preferably 0.0500% or less. The La content may also be 0.0400% or less, 0.0300% or less, or 0.0200% or less.

(Ce: 0 to 0.0500%)

Ce, like La, is an element enabling control of the morphology of sulfides with trace addition and may be included in accordance with need. To sufficiently obtain such an effect, the Ce content is preferably 0.0001% or more. The Ce content may also be 0.0005% or more, 0.0010% or more, or 0.0020% or more. On the other hand, if excessively including Ce, Ce oxides are formed and a drop in hole expandability and other cold workability is sometimes invited. For this reason, the Ce content is preferably 0.0500% or less. The Ce content may also be 0.0400% or less, 0.0300% or less, or 0.0200% or less.

In the steel sheet in the present embodiment, the balance other than the constituents explained above is Fe and impurities. The "impurities" are constituents, etc., entering due to various factors in the producing process, first and foremost the raw materials such as the ores and scraps, etc., when industrially producing the steel sheet according to the present embodiment.

Next, the features of the structure and characteristics of the steel sheet according to an embodiment of the present invention will be explained.

(Number Density of Precipitates Having Diameter of Less Than 0.1 μm in First Depth Region of 1 to 10 μm From Steel Sheet Surface: 10 to 200/μm²)

The steel sheet in the present embodiment contains precipitates having a diameter of less than 0.1 μm in the first depth region of 1 to 10 μm from steel sheet surface in a number density of 10 to 200/μm². By fine precipitates being present in a large number in such a way, the steel sheet structure of the first depth region becomes finer and as a result the strength and hardness in the first depth region of the steel sheet becomes higher than the strength and hardness of the second depth region explained later. For this reason, it is possible to increase the deformation resistance of the steel sheet in the first depth region at the stage heated to a high temperature at the time of spot welding. Therefore, when pressing the electrodes against steel sheets at the time of spot welding and applying current and applying a load while holding them at a high temperature, it is possible to keep down an increase in the plastic strain in the surface layer region of the steel sheet (first depth region). If the number density of the precipitates is low, it is not possible to raise the deformation resistance at the time of welding and becomes difficult to keep down LME crack. For this reason, the lower limit value of the number density of precipitates having a diameter of less than 0.1 μm in the first depth region is 10/μm² or more and may be 15/μm² or more or 30/μm² or more. On the other hand, if the number density of the precipitates is too great, oxides are present in a high density, whereby the electrical resistance of the steel sheet surface increases and the amount of heat emission at the steel sheet surface layer becomes higher. For this reason, sometimes a drop in the weldability is caused. For this reason, the upper limit value of the number density of precipitates having a diameter of less than 0.1 μm in the first depth region is 200/μm² or less and may be 150/μm² or less or 120/μm² or less. The above precipitates may be any precipitates and are not particularly limited, but for example include Ti precipitates and W precipitates, more specifically include Ti oxides and Ti carbides. The "precipitates" in the present invention are for example particles of oxides or carbides such as TiO, $TiO_2$, $Ti_2O_3$, $Ti_3O_5$, and TiC.

(Amount of Dissolved C in Second Depth Region of 10 to 60 μm From Steel Sheet Surface: Less Than 0.20 Mass %)

In general, the amount of dissolved C has an effect on the strength of steel. The greater the amount of dissolved C, the more the deformation resistance increases. On the other hand, the smaller the amount of dissolved C, the more the strength of the steel falls, i.e., the relatively softer the steel becomes. As explained before, to suppress the occurrence of LME crack at the time of spot welding, it is important to prevent an increase of strain at the steel sheet surface layer. Therefore, in the steel sheet according to an embodiment of the present invention, by making the amount of dissolved C in a second depth region of 10 to 60 μm from the steel sheet surface relatively smaller than the C content of the steel sheet as a whole, it is possible to reduce the strength of the depth region. For this reason, the strength of the second depth region becomes lower than the first depth region. As a result, the second depth region can absorb more of the strain introduced to the steel sheet by hot deformation at the time of spot welding than the first depth region and LME crack can be suppressed. If the amount of dissolved C at second depth region is 0.20 mass % or higher, the strength of the steel at the second depth region increases. For this reason, the increase of the strain occurring at the first depth region cannot be sufficiently suppressed at the second depth region and it becomes difficult to suppress LME crack. For this reason, the amount of dissolved C at the depth region is less than 0.20 mass %, preferably is 0.15 mass % or less, more preferably 0.10 mass % or less. The lower limit value of the amount of dissolved C is not particularly limited and may be 0 mass %, but in general is 0.01 mass % and may be 0.02 mass % or 0.03 mass %.

In the steel sheet according to an embodiment of the present invention, at the inner part (center in depth direction of steel sheet) side from the second depth region of 10 to 60 μm from the steel sheet surface, the average carbon concentration becomes substantially the same as or completely the same as the carbon concentration of the base material. For this reason, compared with the second depth region of 10 to 60 μm from the steel sheet surface, a harder layer becomes present in a region 60 μm or more deeper than the steel sheet surface. More specifically, the amount of dissolved C at the depth region of 60 μm to ¼ thickness from the steel sheet surface (below, referred to as the "third depth region") is higher than the amount of dissolved C at the second depth region of 10 to 60 μm from the steel sheet surface. For the purpose of obtaining the effect of the hardness at the third depth region becoming sufficiently higher than the hardness at the second depth region, the amount of dissolved C at the third depth region may be, for example, 1.10 times or more of the amount of dissolved C at the second depth region, 1.15 times or more, or 1.20 times or more and/or 0.40 mass % or less, 0.38 mass % or less, 0.36 mass % or less, or 0.34 mass % or less.

(Plating Layer)

The steel sheet according to an embodiment of the present invention may include a plating layer at least at one surface, preferably at both surfaces, for the purpose of improving the corrosion resistance, etc. This plating layer may be a plating layer having any composition known to persons skilled in the art. It is not particularly limited, but, for example, may include zinc, aluminum, magnesium, or an alloy consisting of any combination thereof. Further, the plating layer may be subjected to alloying treatment or need not be subjected to alloying treatment. If performing the alloying treatment, the plating layer may include an alloy of at least one of the above elements and the iron diffused from the steel sheet. Further, the amount of deposition of the plating layer is not particularly limited and may be a general amount of deposition.

(Tensile Strength: TS)

For lightening the weight of a structural member using steel as its material and for improving the resistance of the structural member in plastic deformation, the steel material preferably has a large work hardening ability and exhibits its maximum strength, specifically preferably has a tensile strength of 1200 MPa or more. If the tensile strength is low, the effect of lightening the weight of the structural member using steel as its material and improving the deformation resistance becomes smaller. For this reason, the tensile strength of the steel sheet is 1200 MPa or more and may also be 1280 MPa or more, 1400 MPa or more, or 1500 MPa or more. On the other hand, if the tensile strength is too high, the material easily becomes brittle and fractures during plastic deformation and falls in formability. For this reason, the tensile strength of the steel sheet is generally 2300 MPa or less and may be 2100 MPa or less, 2000 MPa or less, or 1900 MPa or less. The tensile strength is measured by obtaining a JIS No. 5 test piece from a direction in which a longitudinal direction of the test piece becomes parallel to the direction perpendicular to rolling of the steel sheet and performing a tensile test based on JIS Z 2241(2011).

(Total Elongation: t-El)

According to a specific embodiment of the present invention, in addition to a high strength and excellent weldability, improvement of the total elongation is also possible. For example, a total elongation of 5.0% or more, 7.0% or more, or 10.0% or more can be achieved. The upper limit value is not particularly prescribed, but, for example, the total elongation may be 25.0% or less or 20.0% or less. When working the steel sheet material cold to produce a structural member, elongation becomes required for finishing it to a complicated shape. Therefore, steel sheet able to achieve such a high total elongation is extremely useful in producing a structural member. The total elongation is measured by obtaining a JIS No. 5 test piece from a direction in which a longitudinal direction of the test piece becomes parallel to the direction perpendicular to rolling of the steel sheet and performing a tensile test based on JIS Z 2241(2011).

(Hole Expansion Value: λ)

According to a specific embodiment of the present invention, in addition to a high strength and excellent weldability, improvement of the hole expandability is also possible. For example, a hole expansion value of 10.0% or more, 15.0% or more, or 20.0% or more can be achieved. The upper limit value is not particularly prescribed, but, for example, the hole expansion value may be 90.0% or less or 80.0% or less. When working the steel sheet material cold to produce a structural member, hole expandability becomes required in addition to elongation for finishing it to a complicated shape. Therefore, steel sheet able to realize such a high hole expansion value is extremely useful in producing a structural member. The hole expansion value is determined in the following way. First, a test piece is punched to give a circular hole of a diameter of 10 mm (initial hole: hole diameter d0=10 mm) under conditions giving a clearance of 12.5%. The piece is set so that the burr becomes the die side and the initial hole is expanded by an apex angle 60° conical punch until a crack is formed passing through the sheet thickness. The hole diameter d1 mm at the time of cracking is measured, and the hole expansion value λ (%) of each test piece is found by the following formula. This hole expansion test is performed five times and the average value of these is determined as the hole expansion value λ.

$$\lambda = 100 \times (d1-d0)/d0$$

(Sheet Thickness)

The thickness of the steel sheet is a factor affecting the rigidity of the steel member after shaping. The greater the thickness, the higher the rigidity of the member. Therefore, from the viewpoint of raising the rigidity, a thickness of 0.2 mm or more is preferable. The thickness may be 0.3 mm or more, 0.6 mm or more, 1.0 mm or more, or 2.0 mm or more. On the other hand, if the thickness is too great, the shaping load at the time of bulging increases and sometimes wear of the die or a drop in productivity is invited. For this reason, a thickness of 6.0 mm or less is preferable. The thickness may also be 5.0 mm or less or 4.0 mm or less.

Next, the methods of examination and measurement of the structure prescribed above will be explained.

(Method of Measurement of Number Density of Precipitates Having Diameter of Less Than 0.1 μm in Depth Region of 1 to 10 μm From Sheet Surface)

The diameter and number density of precipitates in the depth region of 1 to 10 μm from the steel sheet surface were measured by observing the structure at a cross-section of the steel. The dispersed state of the precipitates remains unchanged in the direction of observation in the RD direction (rolling direction of steel sheet) or TD direction (transverse direction of steel sheet), therefore it is sufficient to observe the structure in a plane vertical to the ND plane (steel sheet surface). The material is preliminarily treated by mechanical polishing to finish the polished surface to a mirror surface. From the surface layer part, a focused ion beam (FIB) processing device is used to cut out a sample for observation use and was observed by field emission transmission electron microscopy (FE-TEM) by a magnification of 50,000× and analyzed for composition by energy dispersive X-ray spectrometry (EDX) together to identify the precipitates and find the diameters of the individual precipitate particles. The field of observation is a region of 10 μm in the thickness direction and, when making the thickness direction the height direction in the observed image, which is a two-dimensional diagram, a length in the horizontal direction perpendicular to that height direction of 5 μm, i.e., 50 μm². The total number of precipitates having a diameter of less than 0.1 μm obtained by observation and analysis of composition was divided by this area to thereby find the number of precipitates per unit area (number density). Further, if dimensions in which such regions are included, there is no limit on the area of the sample used for observation, but for measuring the amount of dissolved C of the surface layer part explained later, the height of the sample is preferably more than 60 μm. Furthermore, the total number of carbides measured can change if the thickness of the sample changes, therefore the thickness of the sample is 10 to 30 nm. A sample is preferably fabricated to a thickness of 15 to 25 nm.

(Method of Measurement of Amount of Dissolved C in Depth Region of 10 to 60 μm From Steel Sheet Surface)

The amount of dissolved C in the depth region is found by cutting out a sample for evaluation use in the same way as the procedure described above and by observing it by FE-TEM and analyzing it by EDX. To find the composition at the depth region of 10 to 60 μm from the steel sheet surface, the height of the sample has to be at least more than 60 μm. If C is present not as dissolved C, but as precipitates, the form of presence is limited to the two types of nonmetallic inclusions containing oxides and of carbides. The concentration of C at the nonmetallic inclusions containing oxides and the carbides has a value of more than 2 times the average value of the constituent of the steel sheet. For this reason, in the map analyzed values by FE-TEM and EDX in the depth region of 10 to 60 μm from the steel sheet surface, a region of 2 times or less of the average composition of the steel sheet is deemed the steel base phase and the average amount of C of that region is the amount of dissolved C. If measuring the amount of dissolved C of the third depth region, the height of the sample is at least more than 90 μm. In the map analyzed values by FE-TEM and EDX in the depth region of 60 to 90 μm from the steel sheet surface, the region of 2 times or less of the average composition of the steel sheet is deemed the steel base phase, and the average amount of C of that region is the amount of dissolved C at the third depth region (depth region of 60 μm to ¼ thickness from steel sheet surface).

<Method for Producing Steel Sheet>

The method for producing a steel sheet according to an embodiment of the present invention is characterized by using a material having the above-mentioned ranges of constituents and integrally managing the hot rolling and cold rolling and annealing conditions. Specifically, the method for producing a steel sheet according to an embodiment of the present invention comprises a step of hot rolling a steel slab having the same chemical composition as the chemical composition explained above relating to the steel sheet, then coiling it at 580° C. or less, a step of pickling the obtained hot rolled steel sheet to remove oxide scale present on the surface of the hot rolled steel sheet and remove the surface layer of the hot rolled steel sheet down to at least 5 μm, and a step of cold rolling the hot rolled steel sheet, then annealing it, wherein the annealing comprises holding the obtained cold rolled steel sheet in an atmosphere of a dew point of −20 to 20° C. at a temperature region of 200 to 400° C. for 20 to 180 seconds, then holding it in an atmosphere of a dew point of −20 to 20° C. at a temperature region of 740 to 900° C. for 45 to 300 seconds.

(Hot Rolling and Coiling Step)

In this step, a steel slab having the same chemical composition as the chemical composition explained above in relation to the steel sheet is supplied to the hot rolling operation. The steel slab used is preferably cast by a continuous casting method from the viewpoint of productivity, but may also be produced by an ingot making method or thin slab casting method. Further, the cast steel slab may also be optionally roughly rolled before finish rolling so as to adjust the thickness, etc. Such rough rolling need only secure the desired bar dimensions. The conditions are not particularly limited. The hot rolling is not particularly limited, but in general is performed under conditions giving a temperature of completion of finish rolling of 650° C. or more. This is because if the completion temperature of finish rolling is too low, the rolling reaction force will rise and the desired thickness will be difficult to stably obtain. The upper limit is not particularly limited, but in general the completion temperature of finish rolling is 950° C. or less.

(Coiling Temperature)

After the hot rolling, the obtained hot rolled steel sheet is coiled at a coiling temperature of 580° C. or less. The coiling temperature is an important factor controlling the deformation behavior of the steel structure from austenite to ferrite, pearlite, bainite, and martensite and controlling the precipitation behavior of Ti. If coiling at a relatively high temperature, after coiling, sometimes coarse Ti precipitates are formed in the steel structure. In such a case, it becomes no long possible to impart a sufficient gradient of the characteristics (strength, hardness, etc.) to the surface layer structure of the steel sheet after the cold rolled annealing explained in detail later. Therefore, to suppress formation of such coarse Ti precipitates, the coiling temperature is preferably as low as possible, specifically, is 580° C. or less. The coiling temperature is preferably 550° C. or less. For example, the coiling temperature may be room temperature or less, but for coiling at a temperature of room temperature or less, it is necessary to lower the temperature of the water cooling the steel sheet to room temperature or less. This causes an increase of the production costs. Further, due to rapid cooling, the residual stress in the steel sheet rises, therefore for example if coiling the steel sheet at a temperature of less than 10° C., in the later pickling step, when uncoiling the sheet, cracking of the steel sheet is invited and the productivity falls. For this reason, while not limited to this, the lower limit value of the coiling temperature is generally 10° C. or more, preferably is 50° C. or more.

(Pickling Step)

The coiled hot rolled steel sheet is uncoiled and supplied for pickling. By pickling, it is possible to remove oxide scale present on the surface of the hot rolled steel sheet and to improve the chemical convertibility or plateability of the cold rolled steel sheet. "Oxide scale" means the layer of oxides formed on the surface of the steel sheet (external oxide layer) and includes fayalite ($Fe_2SiO_4$) of the complex oxide of FeO and $SiO_2$ formed at the interface with steel sheet, etc. In addition, pickling causes promotion of the dissolution of the surface layer of the steel sheet. The oxides formed below the oxide scale at the surface layer of the hot rolled steel sheet, i.e., formed inside the steel sheet (internal oxides), are also completely removed. By completely removing the oxides formed inside the steel sheet, i.e., by making the thickness of the internal oxide layer formed inside the steel sheet 0 μm, it becomes possible to suppress bonding of the Ti in the steel with oxygen to enable Ti to be present in a dissolved state. Here, the thickness of the internal oxide layer means the distance from the surface of the steel sheet in the case advancing in the thickness direction of the steel sheet (direction vertical to surface of steel sheet) to the furthest position where the internal oxide layer is present. By leaving dissolved Ti at the inside of thickness from the newly formed surface appearing after pickling, it is possible to form large numbers of fine Ti precipitates at the surface-most layer of the steel sheet after cold rolled annealing and as a result impart a sufficient gradient of characteristics to the surface layer structure. The pickling may be performed one time, but may be performed divided into a plurality of times or may be mechanically polished by a grinding brush, etc., before or after pickling for more reliably removing the oxides in the steel formed below the oxide scale of the hot rolled steel sheet. Further, instead of measuring the change of thickness before and after pickling, it is also possible to find the amount of removal of the steel sheet surface layer from the change of the coil weight before and after pickling. If the amount of removal of the steel sheet surface layer is less than 5 μm, the oxides below the oxide scale are not completely removed, i.e., the thickness of the internal oxide layer becomes more than 0 μm. In the heating step at the time of cold rolled annealing, oxygen is supplied from the internal oxides remaining at the steel sheet surface layer, Ti oxides precipitate and coarsen at the steel sheet surface layer, and it becomes no longer possible to impart a sufficient gradient of characteristics to the surface layer structure of the steel sheet after cold rolled annealing. For this reason, the amount of removal of the steel sheet surface layer is 5 μm or more, more specifically 5 μm or more per side, preferably 7 μm or more, more preferably 10 μm or more. The greater the amount of removal of the steel sheet surface layer by the pickling, the better, but excessive melt loss of steel causes a drop in the pickling speed and yield and resultant drop in productivity. Therefore, the upper limit value is generally 150 μm or less and may be 120 μm or less, 100 μm or less, 70 μm or less, 50 μm or less, or 30 μm or less.

(Cold Rolling and Annealing Step)

Finally, the obtained hot rolled steel sheet is cold rolled, then annealed under predetermined conditions (below, referred to as the "cold rolled annealing") whereby the steel sheet according to an embodiment of the present invention is obtained. The rolling reduction in the cold rolling is not limited and may be any suitable value. For example, the rolling reduction may be 5% or more, 10% or more, or 30% or more and/or may be 90% or less, 75% or less, or 50% or less. Below, the cold rolled annealing will be explained in detail.

(Cold Rolled Annealing)

(Dew Point at Temperature Region of 200 to 400° C.)

To raise the dew point of the gas atmosphere in the furnace in the heating step during the cold rolled annealing, specifically by controlling the dew point to a range of −20 to 20° C., it is possible to promote penetration of oxygen to the inside of the steel sheet and form fine Ti precipitates in the surface-most layer part of the steel sheet. These fine Ti precipitates can be used as nuclei for the formation of 10/μm² precipitates with a diameter of less than 0.1 μm at the depth region of 1 to 10 μm from the steel sheet surface in the soaking treatment after the heat treatment and increase of the hardness of the surface-most layer at the steel sheet after cold rolled annealing. If the dew point is too low, the amount of oxygen penetrating inside the steel sheet becomes insufficient and the nuclei of fine Ti precipitates become scarcer, therefore it becomes impossible to cause precipitates to form in a sufficient amount at the surface-most layer of the steel sheet after the cold rolled annealing. For this reason, the lower limit value of the dew point is −20° C. or more, preferably −15° C. or more. On the other hand, if the dew point is high, the amount of oxygen penetrating inside the steel sheet becomes excessive and coarse Ti precipitates are formed in a low number density. For this reason, the upper limit value of the dew point is 20° C. or less, preferably 15° C. or less.

(Holding Time at Temperature Region of 200 to 400° C.)

To form fine Ti precipitates at the surface-most layer part of the steel sheet in the heating step in the cold rolled annealing, along with the dew point, it is effective to control the holding time in the temperature region of 200 to 400° C. Here, the "holding time" means the time of dwelling at the temperature region of 200 to 400° C. and accordingly includes the time when the temperature is being gradually raised between 200 to 400° C. If the holding time is short, the amount of oxygen penetrating inside the steel sheet becomes insufficient and the nuclei of fine Ti precipitates become scarcer, therefore it becomes impossible to cause precipitates to form in a sufficient amount at the surface-most layer of the steel sheet after the cold rolled annealing. For this reason, the lower limit value of the holding time is 20 seconds or more, preferably 30 seconds or more. On the other hand, if the holding time is long, the amount of oxygen penetrating inside the steel sheet becomes excessive and coarse Ti precipitates are formed in a low number density. For this reason, the upper limit value of the holding time is 180 seconds or less, preferably 150 seconds or less.

(Dew Point at Temperature Region of 740 to 900° C.)

By optimizing the dew point and holding time in the temperature region of 200 to 400° C. in cold rolled annealing to cause the formation of fine Ti precipitates at the surface-most layer part of the steel sheet, then using these fine Ti precipitates as nuclei to control the dew point at 740 to 900° C., it is possible to cause the formation of a sufficient amount of precipitates at the surface-most layer of the steel sheet. Further, with holding at 740 to 900° C., dispersion of alloy elements in the steel is promoted more compared with holding at 200 to 400° C., therefore the C dissolved in the steel bonds with the oxygen to be removed in the atmosphere (decarburization reaction), resulting in a drop in the amount of dissolved C. According to this effect, it is possible to decrease the amount of dissolved C in the region of 10 to 60 μm from the steel sheet surface to less than 0.20 mass % and possible to newly form a soft layer at this region. If the dew point is too low, the amount of oxygen penetrating inside the steel sheet becomes insufficient, therefore coarsening of the Ti precipitates and oxides including Si and Mn having these Ti precipitates as nuclei becomes insufficient and it becomes impossible to make precipitates form in a sufficient amount at the surface-most layer after cold rolled annealing. In addition, it becomes no longer possible to decrease the amount of dissolved C at the depth region of 10 to 60 μm from the steel sheet surface. For this reason, the lower limit of the dew point is −20° C. or more, preferably −15° C. or more. On the other hand, if the dew point is high, the amount of oxygen penetrating inside the steel sheet becomes excessive and it becomes no longer possible to suppress the coarsening and merging of Ti precipitates and oxides including Si and Mn having the Ti precipitates as nuclei and the number density of precipitates falls. For this reason, the upper limit of the dew point is 20° C. or less, preferably 15° C. or less.

(Holding Time in Temperature Region of 740 to 900° C.)

By optimizing the dew point and holding time in the temperature region of 200 to 400° C. in cold rolled annealing and causing the formation of fine Ti precipitates at the surface-most layer part of the steel sheet, then using these fine Ti precipitates as nuclei to control the holding time at 740 to 900° C., it is possible to cause the formation of a sufficient amount of precipitates at the surface-most layer of the steel sheet. Further, with holding at 740 to 900° C., dispersion of alloy elements in the steel is promoted more compared with holding at 200 to 400° C., therefore the C dissolved in the steel bonds with the oxygen to be removed in the atmosphere (decarburization reaction), resulting in a drop in the amount of dissolved C. According to this effect, it is possible to decrease the amount of dissolved C in the region of 10 to 60 μm from the steel sheet surface to less than 0.20 mass % and possible to newly form a soft layer at this region. Here, the "holding time" means the time when dwelling in the temperature region of 740 to 900° C. and accordingly encompasses the time in the case where the temperature is gradually raised between 740 to 900° C. If the holding time is short, the amount of oxygen penetrating inside the steel sheet becomes insufficient, therefore coarsening of the Ti precipitates and oxides including Si and Mn having these Ti precipitates as nuclei becomes insufficient and it becomes impossible to make precipitates form in a sufficient amount at the surface-most layer after cold rolled annealing. In addition, it becomes no longer possible to reduce the amount of dissolved C in the depth region of 10 to 60 μm from the steel sheet surface. For this reason, the lower limit value of the holding time is 45 seconds or more, preferably is 48 seconds or more or 60 seconds or more. On the other hand, if the holding time is long, the amount of oxygen penetrating inside the steel sheet becomes excessive and it is longer possible to suppress the coarsening and merging of Ti precipitates and oxides including Si and Mn having the Ti precipitates as nuclei and the number density of precipitates falls. For this reason, the upper limit of the holding time is 300 seconds or less, preferably 250 seconds or less.

In the method for producing steel sheet according to an embodiment of the present invention, as explained above, by making Ti be included so as to form fine precipitates (for example, Ti oxides) at the steel sheet surface layer, more specifically by coiling the hot rolled steel sheet containing Ti at a relatively low coiling temperature of 580° C. or less at the coiling step, the formation of coarse Ti precipitates in the steel structure is suppressed, then making the amount of removal of the hot rolled steel sheet surface layer at the next pickling step 5 μm or more, not only external oxides, but also internal oxides can be completely removed, the Ti in the steel can be kept from bonding with oxygen and Ti can be made present in a dissolved state. Next, by forming fine Ti precipitates by annealing controlled to 200 to 400° C. in the annealing step (dew point: −20 to 20° C., holding time: 20 to 180 seconds), then annealing controlled to 740 to 900° C. (dew point: −20 to 20° C., holding time: 40 to 300 seconds), it is possible to use the above fine Ti precipitates as nuclei for causing a sufficient amount of precipitates to form at the surface-most layer of of the steel sheet. It is possible to increase the hardness of the surface-most layer by precipitation strengthening due to such precipitates. Furthermore, dispersion of alloy elements in the steel at such a high temperature is promoted, C dissolved in the steel bonds with oxygen to be removed in the atmosphere, and the amount of dissolved C at the depth region of 10 to 60 μm from the steel sheet surface can be reduced to less than 0.20 mass %. As a result, it is possible to form a softer layer compared with the surface-most layer at this region. That is, in the method for producing steel sheet according to an embodiment of the present invention, predicated on the presence of Ti, by suitably controlling the production conditions of the steel containing the same, in particular the coiling step, pickling step, and annealing step, it is made possible to impart a sufficient gradient of characteristics such as hardness to the surface layer structure of the steel sheet, etc. The fact that by coming such specific production conditions predicated on the presence of Ti, it is possible to impart a gradient of characteristics to the surface layer structure of the steel sheet has not been known in the past and was first clarified by the present inventors.

(Average Cooling Rate)

Below, a preferred embodiment of the cooling after annealing, tempering, and plating will be explained in detail. The following descriptions are just illustrations of preferred embodiment of the cooling after annealing, tempering, and plating and do not limit the method for producing steel sheet in any way. The cooling after annealing is preferably performed from 750° C. to 550° C. by an average cooling rate of 100° C./s or less. By cooling by a 100° C./s or less average cooling rate, variations in hardness can be suppressed. The average cooling rate may be 80° C./s or less or 60° C./s or less. The lower limit value of the average cooling rate is not particularly prescribed, but from the viewpoint of securing sufficient strength, for example, may be 2.5° C./s, preferably is 5° C./s or more, more preferably 10° C./s or more, most preferably 20° C./s or more.

(Cooling Stop Temperature)

The above cooling is stopped at a temperature of 25 to 550° C. (cooling stop temperature), then, if this cooling stop temperature is lower than a plating bath temperature, the sheet may be reheated to and made to dwell at a temperature region of 350 to 550° C. If cooling in the above-mentioned temperature range, martensite is produced from the untransformed austenite during cooling. After that, by reheating, the martensite is tempered whereby carbides precipitate in the hard phases and dislocations are reversed or realigned and the hydrogen embrittlement resistance is improved.

(Dwell Temperature and Dwell Time)

The steel sheet may be made to dwell at a temperature region of 350 to 550° C. after reheating and before dipping in the plating bath. Dwelling at this temperature region not only contributes to tempering of the martensite, but also eliminates uneven temperature in the transverse direction of the sheet and improves the appearance after plating. If the cooling stop temperature is 350 to 550° C., it is sufficient to perform the dwell operation without reheating. If performing the dwell operation, the dwell time is preferably 10 to 600 seconds.

(Tempering)

Tempering may be performed by starting reheating after cooling the cold rolled sheet, or steel sheet obtained by plating the cold rolled sheet, down to room temperature in the series of annealing step or in the middle of cooling it down to room temperature (however, the martensite transformation start temperature (Ms) or less) and holding it at the 150 to 400° C. temperature region for 2 seconds or more. According to such treatment, it is possible to temper the martensite formed during the cooling after reheating to obtain tempered martensite and thereby improve the hydrogen embrittlement resistance. The tempering may be performed in the continuous annealing facility or may be performed off line by a separate facility after the continuous annealing. At this time, the tempering time differs depending on the tempering temperature. That is, the lower the temperature, the longer the time and the higher the temperature, the shorter the time.

(Plating)

The cold rolled steel sheet during the annealing step or after the annealing step may, as necessary, be heated to (galvanizing bath temperature−40)° C. to (galvanizing bath temperature+50)° C., or cooled to there, and be hot dip galvanized. Due to the hot dip galvanization step, at least one surface, preferably both surfaces, of the cold rolled steel sheet are formed with a hot dip galvanized layer. In this case, the corrosion resistance of the cold rolled steel sheet is improved, therefore this is preferable. Even if performing hot dip galvanization, the LME resistance of the steel sheet can be sufficiently maintained.

(Composition of Plating Bath)

The plating bath preferably is mainly comprised of Zn and has an effective amount of Al (value of total amount of Al in plating bath minus total amount of Fe) of 0.050 to 0.250 mass %. If the effective amount of Al in the plating bath is less than 0.050 mass %, the infiltration of Fe into the plating layer excessively proceeds and the plating adhesion is liable to drop. On the other hand, if the effective amount of Al in the plating bath is more than 0.250 mass %, Al-based oxides obstructing movement of Fe atoms and Zn atoms are formed at the boundary of the steel sheet and the plating layer and the plating adhesion is liable to fall. The effective amount of Al in the plating bath is more preferably 0.065 mass % or more and more preferably 0.180 mass % or less. The plating bath may also contain Mg or other elements in addition to Zn and Al.

(Plating Bath Sheet Temperature)

The plating bath sheet temperature (temperature of steel sheet when dipped in hot dip galvanizing bath) is preferably a temperature range from a temperature 40° C. lower than the hot dip galvanizing bath temperature (hot dip galvanizing bath temperature−40° C.) to a temperature 50° C. higher than the hot dip galvanizing bath temperature (hot dip galvanizing bath temperature+50° C.). If the hot dip coating bath sheet temperature is lower than the hot dip galvanizing bath temperature−40° C., the heat removal at the time of dipping in the plating bath is large and part of the molten zinc will end up solidifying, sometimes causing the appearance to worsen, therefore this is not preferable. If the sheet temperature before dipping is lower than the hot dip galvanizing bath temperature−40° C., any method may be used to further heat the sheet before dipping it in the plating bath to control the sheet temperature to the hot dip galvanizing bath temperature−40° C. or more and then dip the sheet in the plating bath. Further, if the hot dip coating bath sheet temperature is more than the hot dip galvanizing bath temperature+50° C., problems are caused in operation along with the rise in the plating bath temperature.

(Holding Temperature After Dipping in Plating Bath)

If treating the hot dip galvanized layer to alloy it, the steel sheet formed with the hot dip galvanized layer is preferably heated to a temperature range of 470 to 550° C. If the alloying temperature is less than 470° C., the alloying is liable to not sufficiently proceed. On the other hand, if the alloying temperature is more than 550° C., the alloying proceeds too much and Γ phases are formed whereby the concentration of Fe in the plating layer becomes more than 15% and the corrosion resistance is liable to deteriorate. The alloying temperature is more preferably 480° C. or more and more preferably 540° C. or less. The alloying temperature has to be changed in accordance with the chemical composition of the steel sheet and the degree of formation of the internal oxide layer, therefore should be set while confirming the concentration of Fe in the plating layer. On the other hand, if not treating the hot dip galvanized layer to alloy it, the holding temperature after dipping in the plating bath may be less than 470° C., for example, may be 450 to less than 470° C.

(Plating Pretreatment)

To further improve the plating adhesion, before the annealing at the continuous hot dip galvanizing line, the base material steel sheet may be plated with one or more of Ni, Cu, Co, and Fe.

(Plating Post Treatment)

The surface of the hot dip galvanized steel sheet and hot dip galvannealed steel sheet can be given a top plating or treated in various ways, for example, by chromate treatment, phosphate treatment, lubrication improving treatment, weldability improving treatment, etc., for the purpose of improving the coatability and weldability.

(Skin Pass Rolling Reduction)

Furthermore, skin pass rolling may be performed for the purpose of correcting the shape of the steel sheet or introducing movable dislocations so as to improve the ductility. The rolling reduction in skin pass rolling after heat treatment is preferably 0.1 to 1.5% in range. If less than 0.1%, the effect is small and control is also difficult, therefore 0.1% is the lower limit. If more than 1.5%, the productivity remarkably falls, therefore 1.5% is the upper limit. The skin pass may be performed in line or may be performed off line. Further, skin pass of that rolling reduction may be performed at one time or may be performed divided into several operations.

According to the above-mentioned method of production, it is possible to obtain the steel sheet according to an embodiment of the present invention.

Below, examples according to the present invention will be shown. The present invention is not limited to these illustrations of conditions. The present invention can make use of various conditions so long as not departing from the gist of the present invention and achieving the object of the present invention.

EXAMPLES

Example 1

Steels having various chemical compositions were made to produce steel slabs. Each of these steel slabs was inserted to a furnace heated to 1220° C. and held there for 60 minutes for homogenization treatment, then was taken out into the atmosphere and hot rolled to obtain a thickness 2.6 mm steel sheet. The end temperature of the finish rolling in the hot rolling was 910° C. The sheet was cooled down to 550° C. and coiled. Next, the oxide scale of the hot rolled steel sheet was removed by pickling to remove a thickness of 10 μm per side from the surface layers of the two surfaces of the steel sheet (thickness of internal oxide layer after pickling and before cold rolling as shown in Tables 2), cold rolling by a rolling reduction of 45%, and finishing the sheet to a thickness of 1.4 mm. Furthermore, this cold rolled steel sheet was annealed. Specifically, when raising the temperature to 860° C., the atmosphere was controlled to a dew point of −5° C. in the temperature range of 200 to 400° C. The holding time at that temperature range was 30 seconds. In addition, the temperature range of 740 to 900° C. was controlled to an atmosphere of a dew point of 5° C. The holding time at that temperature range was 120 seconds. Next, the cold rolled steel sheet was cooled and made to dwell under the conditions shown in Tables 2, then was rolled by a skin pass. The chemical compositions obtained by analyzing samples taken from the obtained steel sheets were as shown in Tables 1. The balances other than the constituents shown in Tables 1 consisted of Fe and impurities. Further, Tables 2 show the results of evaluation of the characteristics of the steel sheets given the above thermomechanical treatment.

(Evaluation of Tensile Strength, Total Elongation, and Hole Expansion Value)

The tensile strength (TS) and total elongation (t-El) were measured by obtaining a JIS No. 5 test piece from a direction in which a longitudinal direction of the test piece became parallel to the direction perpendicular to rolling of the steel sheet and performing a tensile test based on JIS Z 2241 (2011). Further, the hole expansion value was determined in the following way. First, a test piece was punched to give a circular hole of a diameter of 10 mm (initial hole: hole diameter d0=10 mm) under conditions giving a clearance of 12.5%. The piece was set so that the burr became the die side and the initial hole was expanded by an apex angle 60° conical punch until a crack was formed passing through the sheet thickness. The hole diameter d1 mm at the time of cracking was measured, and the hole expansion value λ (%) of each test piece was found by the following formula. This hole expansion test was performed five times and the average value of these was determined as the hole expansion value λ.

$$\lambda = 100 \times (d1-d0)/d0$$

(Evaluation of LME Resistance)

The LME resistance was evaluated in the following way. A welding test was performed between GA soft steel (hot dip galvannealed steel sheet) and each steel sheet shown in Tables 2 under the following conditions: A test piece welded while changing the current from 4.0 kA to 10.0 kA was prepared. After that, the cross-sectional structure was examined to confirm the nugget sizes and crack lengths. A case where the crack length in a region of a nugget size of 5.5 mm or less was less than 0.1 mm was deemed passing (OK) while a case where the crack length in a region of a nugget size of 5.5 mm or less was 0.1 mm or more was deemed as failing (NG).

Electrodes: Cr—Cu DR type electrodes (tip outside diameters: 8 mm, R: 40 mm)

Applied pressure P: 450 kg

Slant angle θ of electrodes: 5°

Upslope: None

First current application time t1: 0.2 second

Non-current application time tc: 0.04 second

Second current application time t2: 0.4 second

Current ratio I1/I2: 0.7

Holding time after end of current application: 0.1 second

Cases where the tensile strength was 1200 MPa or more and the LME resistance was evaluated as OK were evaluated as steel sheets high in strength and excellent in weldability.

TABLE 1-1

Chemical composition (mass %, balance: Fe and impurities)

| No. | C | Si | Mn | P | S | Al | N | Co | Ni | Mo | Cr | O | Ti | B | Nb |
|---|---|---|---|---|---|---|---|---|---|---|---|---|---|---|---|
| A | 0.24 | 1.43 | 3.78 | 0.0029 | 0.0142 | 1.255 | 0.0085 | — | — | — | — | — | 0.163 | — | — |
| B | 0.26 | 0.41 | 0.64 | 0.0190 | 0.0038 | 0.717 | 0.0021 | — | — | — | — | — | 0.470 | — | — |
| C | 0.32 | 0.15 | 1.93 | 0.0004 | 0.0052 | 1.177 | 0.0172 | — | — | — | — | — | 0.290 | — | — |
| D | 0.39 | 0.97 | 3.34 | 0.0099 | 0.0018 | 1.263 | 0.0159 | — | — | — | — | — | 0.450 | — | — |
| E | 0.34 | 1.35 | 2.33 | 0.0079 | 0.0026 | 0.794 | 0.0005 | — | — | — | — | — | 0.051 | — | — |
| F | 0.23 | 0.82 | 1.88 | 0.0059 | 0.0111 | 0.435 | 0.0037 | — | — | — | — | — | 0.241 | — | — |
| G | 0.28 | 0.42 | 2.55 | 0.0178 | 0.0121 | 0.623 | 0.0133 | — | — | — | — | — | 0.141 | — | — |
| H | 0.32 | 1.78 | 1.47 | 0.0175 | 0.0162 | 0.893 | 0.0062 | — | — | — | — | — | 0.300 | — | — |
| I | 0.31 | 0.56 | 1.37 | 0.0120 | 0.0071 | 0.210 | 0.0093 | — | — | — | — | — | 0.342 | — | — |
| J | 0.22 | 0.72 | 2.14 | 0.0014 | 0.0159 | 0.352 | 0.0198 | — | — | — | — | — | 0.358 | — | — |
| K | 0.37 | 1.04 | 2.53 | 0.0105 | 0.0060 | 1.406 | 0.0029 | — | — | — | 0.0873 | 0.0012 | 0.220 | 0.0016 | — |
| L | 0.34 | 1.87 | 3.06 | 0.0151 | 0.0085 | 0.904 | 0.0079 | — | — | — | 0.1029 | 0.0009 | 0.409 | 0.0008 | — |
| M | 0.39 | 0.23 | 1.19 | 0.0065 | 0.0185 | 0.513 | 0.0152 | 0.1102 | — | — | 1.6048 | — | 0.420 | — | 0.0556 |
| N | 0.21 | 1.84 | 2.63 | 0.0111 | 0.0007 | 0.053 | 0.0114 | — | 0.1255 | — | — | 0.0018 | 0.025 | 0.0070 | — |
| O | 0.25 | 1.21 | 0.30 | 0.0130 | 0.0177 | 1.102 | 0.0122 | 0.0462 | — | 0.6696 | 0.3315 | — | 0.132 | — | 0.0338 |
| P | 0.36 | 0.13 | 3.73 | 0.0038 | 0.0107 | 1.027 | 0.0062 | — | — | 0.0597 | — | — | 0.071 | 0.0014 | — |
| Q | 0.27 | 1.13 | 1.01 | 0.0043 | 0.0065 | 0.105 | 0.0051 | — | — | — | — | — | 0.275 | 0.0011 | 0.0426 |
| R | 0.28 | 1.62 | 0.52 | 0.0166 | 0.0091 | 1.357 | 0.0139 | — | — | — | 0.2090 | — | 0.090 | 0.0016 | — |
| S | 0.37 | 1.51 | 0.81 | 0.0139 | 0.0130 | 0.282 | 0.0183 | 0.1396 | 0.1124 | 0.0528 | 0.2982 | 0.0015 | 0.399 | 0.0032 | 0.0896 |
| T | 0.29 | 0.75 | 2.94 | 0.0086 | 0.0190 | 0.557 | 0.0109 | — | 0.0629 | — | 0.1429 | 0.0020 | 0.200 | — | — |
| U | 0.19 | 0.73 | 2.74 | 0.0127 | 0.0024 | 0.910 | 0.0141 | — | — | — | — | — | 0.335 | — | — |
| V | 0.43 | 1.03 | 1.30 | 0.0007 | 0.0078 | 0.492 | 0.0036 | — | — | — | — | — | 0.203 | 0.0008 | — |
| W | 0.36 | 2.08 | 2.53 | 0.0124 | 0.0093 | 0.720 | 0.0181 | — | — | — | — | — | 0.399 | — | — |
| X | 0.38 | 1.78 | 0.06 | 0.0109 | 0.0098 | 1.302 | 0.0166 | — | — | — | — | — | 0.369 | 0.0015 | — |

Underlines indicate outside scope of present invention.

TABLE 1-2

Chemical composition (mass %, balance: Fe and impurities)

| No. | C | Si | Mn | P | S | Al | N | Co | Ni | Mo | Cr | O | Ti | B | Nb |
|---|---|---|---|---|---|---|---|---|---|---|---|---|---|---|---|
| Y | 0.26 | 0.34 | 4.13 | 0.0190 | 0.0172 | 0.905 | 0.0032 | — | — | — | — | — | 0.054 | 0.0010 | — |
| Z | 0.25 | 1.48 | 1.06 | 0.0205 | 0.0070 | 0.883 | 0.0074 | — | — | — | — | — | 0.234 | — | — |
| AA | 0.23 | 0.39 | 1.78 | 0.0152 | 0.0205 | 0.850 | 0.0036 | — | — | — | — | — | 0.110 | 0.0010 | — |
| AB | 0.39 | 0.20 | 3.78 | 0.0010 | 0.0183 | 1.552 | 0.0025 | — | — | — | — | — | 0.354 | 0.0012 | — |
| AC | 0.26 | 0.49 | 2.52 | 0.0173 | 0.0017 | 1.325 | 0.0206 | — | — | — | — | — | 0.252 | — | — |
| AD | 0.29 | 0.30 | 0.78 | 0.0104 | 0.0042 | 0.551 | 0.0110 | 0.5141 | 0.5031 | 0.0991 | — | — | 0.143 | — | 0.0428 |
| AE | 0.34 | 0.34 | 0.49 | 0.0173 | 0.0103 | 0.688 | 0.0061 | 0.1256 | 1.0377 | 0.1602 | — | — | 0.403 | 0.0068 | — |
| AF | 0.30 | 1.90 | 1.66 | 0.0041 | 0.0029 | 0.358 | 0.0085 | — | — | 1.0374 | 1.3711 | — | 0.437 | 0.0037 | 0.0518 |
| AG | 0.32 | 0.20 | 1.46 | 0.0046 | 0.0163 | 0.261 | 0.0157 | 0.0467 | — | 0.7288 | 2.0770 | 0.0015 | 0.114 | — | 0.4037 |
| AH | 0.26 | 1.09 | 3.87 | 0.0045 | 0.0128 | 0.514 | 0.0086 | — | 0.6500 | — | — | 0.0020 | 0.003 | — | — |
| AI | 0.31 | 1.68 | 2.16 | 0.0107 | 0.0039 | 0.384 | 0.0145 | 0.0274 | 0.0691 | 0.3840 | 0.1303 | — | 0.519 | — | 0.0287 |
| AJ | 0.37 | 1.46 | 3.81 | 0.0075 | 0.0010 | 1.036 | 0.0064 | 0.0363 | 0.0868 | — | 0.3753 | — | 0.258 | 0.0104 | — |
| AK | 0.36 | 1.75 | 2.89 | 0.0168 | 0.0136 | 0.063 | 0.0050 | — | 0.1065 | 0.1045 | 0.1444 | 0.0024 | 0.441 | 0.0073 | — |
| AL | 0.25 | 1.31 | 2.98 | 0.0143 | 0.0164 | 0.267 | 0.0192 | 0.0984 | 0.0690 | — | — | 0.0022 | 0.185 | 0.0019 | 0.0481 |
| AM | 0.32 | 1.37 | 3.23 | 0.0062 | 0.0132 | 0.178 | 0.0175 | 0.1902 | 0.1625 | 0.1542 | 0.1101 | 0.0106 | 0.061 | 0.0019 | — |
| AN | 0.34 | 1.59 | 2.37 | 0.0157 | 0.0091 | 1.009 | 0.0095 | — | 0.2199 | — | 1.3785 | — | 0.286 | 0.0011 | 0.0446 |
| AO | 0.34 | 0.38 | 3.26 | 0.0127 | 0.0029 | 1.252 | 0.0091 | 0.2905 | — | — | — | 0.0012 | 0.457 | — | 0.0287 |
| AP | 0.39 | 1.03 | 3.30 | 0.0157 | 0.0178 | 1.060 | 0.0152 | 0.0354 | — | — | 0.1081 | — | 0.177 | 0.0006 | — |
| AQ | 0.23 | 0.77 | 2.66 | 0.0172 | 0.0084 | 0.147 | 0.0177 | — | 0.0811 | 0.1027 | — | 0.0089 | 0.277 | — | 0.1079 |
| AR | 0.31 | 1.76 | 3.55 | 0.0076 | 0.0021 | 0.573 | 0.0110 | 0.0908 | 0.8393 | — | — | — | 0.160 | 0.0014 | 0.1267 |
| AS | 0.22 | 1.32 | 1.81 | 0.0093 | 0.0080 | 0.389 | 0.0015 | — | — | 0.1399 | — | 0.0010 | 0.326 | — | — |
| AT | 0.20 | 0.84 | 1.87 | 0.0067 | 0.0048 | 0.176 | 0.0025 | 0.2094 | 0.0655 | — | — | 0.0018 | 0.169 | — | 0.0451 |
| AU | 0.30 | 0.42 | 0.49 | 0.0047 | 0.0189 | 0.203 | 0.0087 | — | 0.1566 | — | 0.1527 | — | 0.259 | — | — |

Underlines indicate outside scope of present invention.

TABLE 1-3

Chemical composition (mass %, balance: Fe and impurities)

| No. | V | Cu | W | Ta | Sn | Sb | As | Mg | Ca | Y | Zr | La | Ce |
|---|---|---|---|---|---|---|---|---|---|---|---|---|---|
| A | — | — | — | — | — | — | — | — | — | — | — | — | — |
| B | — | — | — | — | — | — | — | — | — | — | — | — | — |
| C | — | — | — | — | — | — | — | — | — | — | — | — | — |
| D | — | — | — | — | — | — | — | — | — | — | — | — | — |

TABLE 1-3-continued

| | Chemical composition (mass %, balance: Fe and impurities) | | | | | | | | | | | | |
|---|---|---|---|---|---|---|---|---|---|---|---|---|---|
| No. | V | Cu | W | Ta | Sn | Sb | As | Mg | Ca | Y | Zr | La | Ce |
| E | — | — | — | — | — | — | — | — | — | — | — | — | — |
| F | — | — | — | — | — | — | — | — | — | — | — | — | — |
| G | — | — | — | — | — | — | — | — | — | — | — | — | — |
| H | — | — | — | — | — | — | — | — | — | — | — | — | — |
| I | — | — | — | — | — | — | — | — | — | — | — | — | — |
| J | — | — | — | — | — | — | — | — | — | — | — | — | — |
| K | — | — | 0.0069 | — | 0.0045 | 0.0145 | — | — | — | — | 0.0049 | 0.0041 | 0.0108 |
| L | — | — | — | — | — | — | — | — | — | — | — | — | — |
| M | — | 0.0597 | 0.0760 | 0.0791 | — | 0.0062 | — | 0.0036 | 0.0391 | — | — | 0.0052 | 0.0393 |
| N | 0.0484 | — | — | 0.0087 | 0.0067 | — | 0.0034 | — | — | 0.0242 | — | — | 0.0046 |
| O | 0.0380 | — | 0.0069 | — | — | 0.0043 | 0.0324 | — | 0.0058 | 0.0044 | 0.0036 | — | — |
| P | — | — | — | — | — | — | — | — | — | — | — | — | — |
| Q | — | — | — | — | — | — | — | — | — | — | — | — | — |
| R | — | — | — | — | — | — | — | — | — | — | — | — | — |
| S | 0.0713 | 0.0580 | 0.0110 | 0.0129 | 0.0031 | 0.0041 | 0.0248 | 0.0142 | 0.0241 | 0.0059 | 0.0043 | 0.0392 | 0.0046 |
| T | 0.0538 | — | 0.0191 | — | — | — | 0.0143 | — | 0.0051 | — | — | — | — |
| U | — | — | — | — | — | — | — | — | — | — | — | — | — |
| V | — | — | — | — | — | — | — | — | — | — | — | — | — |
| W | — | — | — | — | — | — | — | — | — | — | — | — | — |
| X | — | — | — | — | — | — | — | — | — | — | — | — | — |

Underlines indicate outside scope of present invention.

TABLE 1-4

| | Chemical composition (mass %, balance: Fe and impurities) | | | | | | | | | | | | |
|---|---|---|---|---|---|---|---|---|---|---|---|---|---|
| No. | V | Cu | W | Ta | Sn | Sb | As | Mg | Ca | Y | Zr | La | Ce |
| Y | — | — | — | — | — | — | — | — | — | — | — | — | — |
| Z | — | — | — | — | — | — | — | — | — | — | — | — | — |
| AA | — | — | — | — | — | — | — | — | — | — | — | — | — |
| AB | — | — | — | — | — | — | — | — | — | — | — | — | — |
| AC | — | — | — | — | — | — | — | — | — | — | — | — | — |
| AD | — | — | 0.0299 | — | 0.0049 | — | 0.0043 | 0.0050 | 0.0036 | — | — | 0.0059 | — |
| AE | — | 0.1857 | 0.0180 | 0.0728 | — | 0.0231 | 0.0043 | — | 0.0030 | — | 0.0040 | 0.0094 | 0.0035 |
| AF | 0.0605 | — | — | — | 0.0055 | — | — | 0.0388 | — | 0.0263 | 0.0035 | — | 0.0090 |
| AG | — | 0.0355 | — | 0.0087 | — | 0.0052 | 0.0044 | — | 0.0050 | 0.0047 | — | 0.0029 | — |
| AH | — | 0.0734 | 0.0113 | — | 0.0053 | — | 0.0049 | 0.0035 | 0.0070 | — | 0.0055 | 0.0049 | 0.0046 |
| AI | — | 0.0480 | — | 0.0084 | 0.0347 | — | — | — | — | 0.0059 | — | — | 0.0041 |
| AJ | 0.0335 | 0.0194 | 0.0829 | — | 0.0048 | — | 0.0413 | 0.0060 | — | 0.0062 | 0.0049 | — | 0.0372 |
| AK | <u>0.5133</u> | 0.2486 | 0.0065 | 0.0117 | — | — | — | 0.0371 | 0.0048 | — | 0.0319 | 0.0066 | 0.0052 |
| AL | <u>0.0301</u> | <u>0.5158</u> | 0.0118 | — | 0.0022 | 0.0029 | 0.0054 | — | — | — | 0.0369 | — | 0.0259 | 0.0324 |
| AM | 0.2935 | — | 0.0257 | <u>0.1040</u> | 0.0301 | 0.0040 | — | — | — | — | — | 0.0025 | 0.0044 | — |
| AN | — | 0.4181 | 0.0185 | — | <u>0.0512</u> | — | — | — | 0.0265 | 0.0027 | — | — | — | 0.0049 |
| AO | 0.0286 | 0.0337 | — | — | 0.0056 | <u>0.0513</u> | 0.0049 | — | 0.0059 | — | 0.0056 | 0.0417 | — |
| AP | 0.1107 | 0.1012 | — | — | 0.0030 | — | <u>0.0516</u> | 0.0081 | — | 0.0056 | 0.0383 | — | 0.0092 |
| AQ | 0.0508 | — | 0.0055 | — | — | 0.0330 | — | <u>0.0510</u> | 0.0379 | — | — | — | — |
| AR | 0.0431 | 0.0387 | — | — | — | — | 0.0091 | — | <u>0.0048</u> | 0.0514 | 0.0042 | 0.0035 | — |
| AS | 0.3907 | 0.4142 | 0.0757 | — | 0.0382 | 0.0421 | — | — | — | <u>0.0096</u> | 0.0510 | 0.0218 | — |
| AT | 0.0357 | — | — | 0.0112 | — | — | — | 0.0041 | 0.0049 | 0.0025 | <u>—</u> | 0.0519 | — |
| AU | — | 0.0260 | 0.0148 | — | — | 0.0031 | — | — | 0.0047 | — | 0.0195 | <u>—</u> | 0.0518 |

Underlines indicate outside scope of present invention.

TABLE 2-1

| No. | Finish rolling completion temp. (° C.) | Coiling temp. (° C.) | Am't of removal of steel sheet surface layer (μm) | Thickness of internal oxide layer before cold rolling (μm) | Cold rolling reduction (%) | Cold rolled annealing | | | | | | | | Skin pass rolling reduction (%) |
|---|---|---|---|---|---|---|---|---|---|---|---|---|---|---|
| | | | | | | 200 to 400° C. | | 740 to 900° C. | | Average cooling rate from 750° C. to 550° C. (° C./s) | Cooling stop temp. (° C.) | Dwell temp. (° C.) | Dwell time (s) | Tempering temp. (° C.) | Plating | |
| | | | | | | Dew point (° C.) | Holding time (s) | Dew point (° C.) | Holding time (s) | | | | | | | |
| A-1 | 910 | 550 | 10 | 0.00 | 45 | −5 | 30 | 5 | 120 | 40 | 190 | 280 | 120 | No | No | 0.3 |
| B-1 | 910 | 550 | 10 | 0.00 | 45 | −5 | 30 | 5 | 120 | 40 | 190 | 280 | 120 | No | No | 0.3 |
| C-1 | 910 | 550 | 10 | 0.00 | 45 | −5 | 30 | 5 | 120 | 40 | 190 | 280 | 120 | No | No | 0.3 |

TABLE 2-1-continued

| No. | Finish rolling completion temp. (° C.) | Coiling temp. (° C.) | Am't of removal of steel sheet surface layer (μm) | Thickness of internal oxide layer before cold rolling (μm) | Cold rolling reduction (%) | 200 to 400° C. Dew point (° C.) | 200 to 400° C. Holding time (s) | 740 to 900° C. Dew point (° C.) | 740 to 900° C. Holding time (s) | Average cooling rate from 750° C. to 550° C. (° C./s) | Cooling stop temp. (° C.) | Dwell temp. (° C.) | Dwell time (s) | Tempering (° C.) | Plating | Skin pass rolling reduction (%) |
|---|---|---|---|---|---|---|---|---|---|---|---|---|---|---|---|---|
| D-1 | 910 | 550 | 10 | 0.00 | 45 | −5 | 30 | 5 | 120 | 40 | 190 | 280 | 120 | No | No | 0.3 |
| E-1 | 910 | 550 | 10 | 0.00 | 45 | −5 | 30 | 5 | 120 | 40 | 190 | 280 | 120 | No | No | 0.3 |
| F-1 | 910 | 550 | 10 | 0.00 | 45 | −5 | 30 | 5 | 120 | 40 | 190 | 280 | 120 | No | No | 0.3 |
| G-1 | 910 | 550 | 10 | 0.00 | 45 | −5 | 30 | 5 | 120 | 40 | 190 | 280 | 120 | No | No | 0.3 |
| H-1 | 910 | 550 | 10 | 0.00 | 45 | −5 | 30 | 5 | 120 | 40 | 190 | 280 | 120 | No | No | 0.3 |
| I-1 | 910 | 550 | 10 | 0.00 | 45 | −5 | 30 | 5 | 120 | 40 | 190 | 280 | 120 | No | No | 0.3 |
| J-1 | 910 | 550 | 10 | 0.00 | 45 | −5 | 30 | 5 | 120 | 40 | 190 | 280 | 120 | No | No | 0.3 |
| K-1 | 910 | 550 | 10 | 0.00 | 45 | −5 | 30 | 5 | 120 | 40 | 190 | 280 | 120 | No | No | 0.3 |
| L-1 | 910 | 550 | 10 | 0.00 | 45 | −5 | 30 | 5 | 120 | 40 | 190 | 280 | 120 | No | No | 0.3 |
| M-1 | 910 | 550 | 10 | 0.00 | 45 | −5 | 30 | 5 | 120 | 40 | 190 | 280 | 120 | No | No | 0.3 |
| N-1 | 910 | 550 | 10 | 0.00 | 45 | −5 | 30 | 5 | 120 | 40 | 190 | 280 | 120 | No | No | 0.3 |
| O-1 | 910 | 550 | 10 | 0.00 | 45 | −5 | 30 | 5 | 120 | 40 | 190 | 280 | 120 | No | No | 0.3 |
| P-1 | 910 | 550 | 10 | 0.00 | 45 | −5 | 30 | 5 | 120 | 40 | 190 | 280 | 120 | No | No | 0.3 |
| Q-1 | 910 | 550 | 10 | 0.00 | 45 | −5 | 30 | 5 | 120 | 40 | 190 | 280 | 120 | No | No | 0.3 |
| R-1 | 910 | 550 | 10 | 0.00 | 45 | −5 | 30 | 5 | 120 | 40 | 190 | 280 | 120 | No | No | 0.3 |
| S-1 | 910 | 550 | 10 | 0.00 | 45 | −5 | 30 | 5 | 120 | 40 | 190 | 280 | 120 | No | No | 0.3 |
| T-1 | 910 | 550 | 10 | 0.00 | 45 | −5 | 30 | 5 | 120 | 40 | 190 | 280 | 120 | No | No | 0.3 |
| U-1 | 910 | 550 | 10 | 0.00 | 45 | −5 | 30 | 5 | 120 | 40 | 190 | 280 | 120 | No | No | 0.3 |
| V-1 | 910 | 550 | 10 | 0.00 | 45 | −5 | 30 | 5 | 120 | 40 | 190 | 280 | 120 | No | No | 0.3 |
| W-1 | 910 | 550 | 10 | 0.00 | 45 | −5 | 30 | 5 | 120 | 40 | 190 | 280 | 120 | No | No | 0.3 |
| X-1 | 910 | 550 | 10 | 0.00 | 45 | −5 | 30 | 5 | 120 | 40 | 190 | 280 | 120 | No | No | 0.3 |

Underlines indicate outside scope of present invention.

TABLE 2-2

| No. | Finish rolling completion temp. (° C.) | Coiling temp. (° C.) | Am't of removal of steel sheet surface layer (μm) | Thickness of internal oxide layer before cold rolling (μm) | Cold rolling reduction (%) | 200 to 400° C. Dew point (° C.) | 200 to 400° C. Holding time (s) | 740 to 900° C. Dew point (° C.) | 740 to 900° C. Holding time (s) | Average cooling rate from 750° C. to 550° C. (° C./s) | Cooling stop temp. (° C.) | Dwell temp. (° C.) | Dwell time (s) | Tempering (° C.) | Plating | Skin pass rolling reduction (%) |
|---|---|---|---|---|---|---|---|---|---|---|---|---|---|---|---|---|
| Y-1 | 910 | 550 | 10 | 0.00 | 45 | −5 | 30 | 5 | 120 | 40 | 190 | 280 | 120 | No | No | 0.3 |
| Z-1 | 910 | 550 | 10 | 0.00 | 45 | −5 | 30 | 5 | 120 | 40 | 190 | 280 | 120 | No | No | 0.3 |
| AA-1 | 910 | 550 | 10 | 0.00 | 45 | −5 | 30 | 5 | 120 | 40 | 190 | 280 | 120 | No | No | 0.3 |
| AB-1 | 910 | 550 | 10 | 0.00 | 45 | −5 | 30 | 5 | 120 | 40 | 190 | 280 | 120 | No | No | 0.3 |
| AC-1 | 910 | 550 | 10 | 0.00 | 45 | −5 | 30 | 5 | 120 | 40 | 190 | 280 | 120 | No | No | 0.3 |
| AD-1 | 910 | 550 | 10 | 0.00 | 45 | −5 | 30 | 5 | 120 | 40 | 190 | 280 | 120 | No | No | 0.3 |
| AE-1 | 910 | 550 | 10 | 0.00 | 45 | −5 | 30 | 5 | 120 | 40 | 190 | 280 | 120 | No | No | 0.3 |
| AF-1 | 910 | 550 | 10 | 0.00 | 45 | −5 | 30 | 5 | 120 | 40 | 190 | 280 | 120 | No | No | 0.3 |
| AG-1 | 910 | 550 | 10 | 0.00 | 45 | −5 | 30 | 5 | 120 | 40 | 190 | 280 | 120 | No | No | 0.3 |
| AH-1 | 910 | 550 | 10 | 0.00 | 45 | −5 | 30 | 5 | 120 | 40 | 190 | 280 | 120 | No | No | 0.3 |
| \AI-1 | 910 | 550 | 10 | 0.00 | 45 | −5 | 30 | 5 | 120 | 40 | 190 | 280 | 120 | No | No | 0.3 |
| AJ-1 | 910 | 550 | 10 | 0.00 | 45 | −5 | 30 | 5 | 120 | 40 | 190 | 280 | 120 | No | No | 0.3 |
| AK-1 | 910 | 550 | 10 | 0.00 | 45 | −5 | 30 | 5 | 120 | 40 | 190 | 280 | 120 | No | No | 0.3 |
| AL-1 | 910 | 550 | 10 | 0.00 | 45 | −5 | 30 | 5 | 120 | 40 | 190 | 280 | 120 | No | No | 0.3 |
| AM-1 | 910 | 550 | 10 | 0.00 | 45 | −5 | 30 | 5 | 120 | 40 | 190 | 280 | 120 | No | No | 0.3 |
| AN-1 | 910 | 550 | 10 | 0.00 | 45 | −5 | 30 | 5 | 120 | 40 | 190 | 280 | 120 | No | No | 0.3 |
| AO-1 | 910 | 550 | 10 | 0.00 | 45 | −5 | 30 | 5 | 120 | 40 | 190 | 280 | 120 | No | No | 0.3 |
| AP-1 | 910 | 550 | 10 | 0.00 | 45 | −5 | 30 | 5 | 120 | 40 | 190 | 280 | 120 | No | No | 0.3 |
| AQ-1 | 910 | 550 | 10 | 0.00 | 45 | −5 | 30 | 5 | 120 | 40 | 190 | 280 | 120 | No | No | 0.3 |
| AR-1 | 910 | 550 | 10 | 0.00 | 45 | −5 | 30 | 5 | 120 | 40 | 190 | 280 | 120 | No | No | 0.3 |
| AS-1 | 910 | 550 | 10 | 0.00 | 45 | −5 | 30 | 5 | 120 | 40 | 190 | 280 | 120 | No | No | 0.3 |
| AT-1 | 910 | 550 | 10 | 0.00 | 45 | −5 | 30 | 5 | 120 | 40 | 190 | 280 | 120 | No | No | 0.3 |
| AU-1 | 910 | 550 | 10 | 0.00 | 45 | −5 | 30 | 5 | 120 | 40 | 190 | 280 | 120 | No | No | 0.3 |

Underlines indicate outside scope of present invention.

TABLE 2-3

| No. | Number density at 1 to 10 μm depth of precipitates having diameter of less than 0.1 μm (/μm²) | Amount of dissolved C at 10 to 60 μm depth (mass %) | TS (MPa) | t-El (%) | λ (%) | LME resistance | Remarks |
|---|---|---|---|---|---|---|---|
| A-1 | 125 | 0.10 | 1234 | 12.9 | 17.0 | OK | Ex. |
| B-1 | 19 | 0.07 | 1247 | 11.6 | 17.4 | OK | Ex. |
| C-1 | 17 | 0.07 | 1287 | 11.1 | 18.7 | OK | Ex. |
| D-1 | 76 | 0.12 | 1567 | 10.6 | 18.8 | OK | Ex. |
| E-1 | 118 | 0.03 | 1573 | 10.4 | 22.1 | OK | Ex. |
| F-1 | 62 | 0.10 | 1566 | 9.5 | 35.0 | OK | Ex. |
| G-1 | 46 | 0.07 | 1801 | 8.1 | 30.6 | OK | Ex. |
| H-1 | 146 | 0.15 | 1245 | 13.7 | 17.4 | OK | Ex. |
| I-1 | 71 | 0.04 | 1709 | 8.6 | 26.9 | OK | Ex. |
| J-1 | 145 | 0.06 | 1573 | 9.3 | 37.4 | OK | Ex. |
| K-1 | 58 | 0.07 | 1265 | 13.6 | 17.9 | OK | Ex. |
| L-1 | 90 | 0.04 | 1453 | 11.7 | 21.9 | OK | Ex. |
| M-1 | 24 | 0.03 | 2188 | 7.1 | 11.1 | OK | Ex. |
| N-1 | 102 | 0.08 | 1515 | 10.5 | 36.2 | OK | Ex. |
| O-1 | 17 | 0.11 | 1254 | 13.6 | 22.9 | OK | Ex. |
| P-1 | 136 | 0.05 | 1254 | 10.6 | 36.1 | OK | Ex. |
| Q-1 | 26 | 0.07 | 1510 | 10.2 | 26.8 | OK | Ex. |
| R-1 | 114 | 0.10 | 1266 | 15.1 | 31.8 | OK | Ex. |
| S-1 | 68 | 0.04 | 2028 | 8.6 | 18.9 | OK | Ex. |
| T-1 | 97 | 0.07 | 1861 | 8.1 | 28.7 | OK | Ex. |
| U-1 | 53 | 0.14 | <u>1186</u> | 12 | 23.7 | OK | Comp. ex. |
| V-1 | 147 | <u>0.23</u> | <u>2251</u> | 3.6 | 9.3 | NG | Comp. ex. |
| W-1 | 52 | <u>0.22</u> | 1642 | 4.8 | 23.6 | NG | Comp. ex. |
| X-1 | 106 | 0.07 | <u>795</u> | 24.4 | 38.0 | OK | Comp. ex. |

Underlines indicate outside scope of present invention.

TABLE 2-4

| No. | Number density at 1 to 10 μm depth of precipitates having diameter of less than 0.1 μm (/μm²) | Amount of dissolved C at 10 to 60 μm depth (mass %) | TS (MPa) | t-El (%) | λ (%) | LME resistance | Remarks |
|---|---|---|---|---|---|---|---|
| Y-1 | <u>8</u> | 0.11 | 1535 | 4.9 | 29.7 | NG | Comp. ex. |
| Z-1 | <u>8</u> | 0.05 | <u>1101</u> | 4.7 | 17.1 | NG | Comp. ex. |
| AA-1 | <u>9</u> | 0.13 | <u>1225</u> | 11.5 | 20.5 | NG | Comp. ex. |
| AB-1 | 142 | 0.03 | <u>694</u> | 20.6 | 50.1 | OK | Comp. ex. |
| AC-1 | <u>6</u> | 0.08 | <u>1274</u> | 11.6 | 17.0 | NG | Comp. ex. |
| AD-1 | 26 | 0.05 | 1516 | 4.6 | 25.7 | OK | Ref. ex. |
| AE-1 | 16 | 0.08 | 1772 | 4.7 | 24.8 | OK | Ref. ex. |
| AF-1 | 57 | 0.08 | 1778 | 4.8 | 28.8 | OK | Ref. ex. |
| AG-1 | 30 | 0.07 | 1974 | 4.4 | 22.8 | OK | Ref. ex. |
| AH-1 | <u>5</u> | 0.08 | 1733 | 8.7 | 33.4 | NG | Comp. ex. |
| AI-1 | <u>214</u> | 0.11 | <u>778</u> | 19.0 | 46.4 | OK | Comp. ex. |
| AJ-1 | 54 | 0.08 | <u>1665</u> | 4.2 | 6.1 | OK | Ref. ex. |
| AK-1 | 39 | 0.04 | 2053 | 8.2 | 2.8 | OK | Ref. ex. |
| AL-1 | 104 | 0.10 | 1746 | 8.9 | 3.0 | OK | Ref. ex. |
| AM-1 | 46 | 0.12 | 1966 | 4.1 | 3.2 | OK | Ref. ex. |
| AN-1 | 113 | 0.12 | 1399 | 12.3 | 7.7 | OK | Ref. ex. |
| AO-1 | 97 | 0.06 | 1415 | 10.3 | 8.2 | OK | Ref. ex. |
| AP-1 | 46 | 0.08 | 1604 | 10.1 | 4.2 | OK | Ref. ex. |
| AQ-1 | 148 | 0.12 | 1674 | 8.6 | 7.8 | OK | Ref. ex. |
| AR-1 | 125 | 0.07 | 1703 | 9.7 | 6.0 | OK | Ref. ex. |
| AS-1 | 63 | 0.04 | 1510 | 10.4 | 6.5 | OK | Ref. ex. |
| AT-1 | 110 | 0.06 | 1475 | 9.8 | 7.2 | OK | Ref. ex. |
| AU-1 | 105 | 0.15 | 1363 | 10.4 | 4.1 | OK | Ref. ex. |

Underlines indicate outside scope of present invention.

Referring to Tables 2, Example U-1 had a low C content, therefore the tensile strength was less than 1200 MPa. Example V-1 had a high C content, therefore the LME resistance fell along with a drop in the elongation. Example W-1 had a high Si content, therefore the elongation fell along with the increase of the tensile strength and, further, the LME resistance fell. Example X-1 had a low Mn content, therefore the tensile strength was less than 1200 MPa. Example Y-1 had a high Mn content, therefore the elongation fell along with the increase of the tensile strength and, further, the LME resistance fell. Example Z-1 had a high P content, therefore the steel sheet ended up becoming brittle and the LME resistance fell. Example AA-1 had a high S content, therefore the LME resistance fell. Example AB-1 had a high Al content, therefore ferrite transformation, etc., was excessively promoted and a sufficient tensile strength could not be obtained. Example AC-1 had a high N content, therefore the formation of precipitates at the steel sheet surface layer could not be controlled and the LME resistance fell. Example AH-1 had a low Ti content, therefore the precipitates could not be made to sufficiently form at the steel sheet surface layer and the LME resistance fell. Example AI-1 had a high Ti content, therefore precipitates excessively formed and the tensile strength fell. On the other hand, Examples AD-1 to AG-1 were excellent in tensile strengths and LME resistances, but were respectively high in Co, Ni, Mo, and Cr contents, therefore sufficient elongation could not be achieved. Similarly, Examples AJ-1 to AU-1 were excellent in tensile strengths and LME resistances, but were respectively high in B, V, Cu, Ta, Sn, Sb, Mg, Ca, Y, Zr, La, and Ce contents, therefore sufficient hole expandability could not be achieved. These examples solve the technical problem of the present invention of "providing steel sheet high in strength and excellent in weldability", but the contents of the elements are outside the scope of the present invention, therefore they are designated as reference examples.

In contrast to this, in Examples A-1 to T-1, by suitably controlling the chemical compositions and structures of the steel sheets, it was possible to obtain steel sheets having high strength and excellent LME resistance and improved in total elongation and hole expandability as well. Further, while not particularly shown in Tables 2, the amounts of dissolved C in the depth regions of 60 μm to ¼ thicknesses from the steel sheet surface were higher than the amounts of dissolved C in the depth regions of 10 to 60 μm from the steel sheet surface, more specifically, were 1.20 times or more the amounts of dissolved C in the depth regions of 10 to 60 μm from the steel sheet surface.

Example 2

Furthermore, to investigate the production conditions, the Steel Types A to T recognized as being excellent in characteristics in Tables 2 were thermomechanically treated under the production conditions described in Tables 3 to prepare thickness 1.4 mm cold rolled steel sheets which were evaluated for the characteristics of the steel sheets after cold rolled annealing. Here, the plated steel sheets were held at the temperatures shown in Tables 3 after dipping the steel sheets in a hot dip galvanizing bath and formed hot dip galvanized steel sheets when the holding temperatures were 450 to less than 470° C. and formed hot dip galvannealed steel sheets giving alloyed plating layers of iron and zinc to the surfaces of the steel sheets when the holding temperatures were 470° C. or more. Further, in the cold rolled annealing, while cooling down to room temperature the steel sheets which had been held at the respective dwell temperatures, the steel sheets which were once cooled down to 150° C. were reheated and held there for 2 seconds or more as tempering treatment. The obtained results are shown in Tables 3. The methods of evaluation of the characteristics are similar to the case of Example 1.

TABLE 3-1

| No. | Finish rolling completion temp. (° C.) | Coiling temp. (° C.) | Am't of removal of steel sheet surface layer (μm) | Thickness of internal oxide layer before cold rolling (μm) | Cold rolling reduction (%) | 200 to 400° C. Dew point (° C.) | 200 to 400° C. Holding time (s) | 740 to 900° C. Dew point (° C.) | 740 to 900° C. Holding time (s) | Average cooling rate from 750° C. to 550° C. (° C./s) | Cooling stop temp. (° C.) | Dwell temp. (° C.) | Dwell time (s) | Tempering (° C.) | Plating | Holding temp. after dipping in plating bath (° C.) | Skin pass rolling reduction (%) |
|---|---|---|---|---|---|---|---|---|---|---|---|---|---|---|---|---|---|
| A-2 | 818 | 102 | 47 | 0.00 | 61 | −11 | 118 | 3 | 169 | 68 | 333 | 514 | 433 | 169 | No | — | 0.5 |
| B-2 | 735 | 49 | 51 | 0.00 | 15 | 13 | 123 | −26 | 178 | 45 | 141 | 445 | 102 | 193 | No | — | 0.9 |
| C-2 | 834 | 182 | 82 | 0.00 | 32 | 13 | 24 | 17 | 251 | 47 | 81 | 407 | 387 | 257 | Yes | 454 | 0.8 |
| D-2 | 844 | 554 | 63 | 0.00 | 61 | 10 | 165 | −18 | 34 | 31 | 129 | 504 | 427 | 336 | No | — | 0.3 |
| E-2 | 798 | 164 | 85 | 0.00 | 37 | −10 | 42 | 6 | 227 | 8 | 409 | 447 | 383 | 273 | No | — | 0.6 |
| F-2 | 929 | 390 | 58 | 0.00 | 38 | −26 | 158 | 9 | 192 | 21 | 509 | 510 | 166 | 279 | Yes | 479 | 0.8 |
| G-2 | 922 | 22 | 12 | 0.00 | 46 | −13 | 165 | 6 | 190 | 58 | 91 | 434 | 397 | 367 | No | — | 0.2 |
| H-2 | 902 | 368 | 83 | 0.00 | 59 | 9 | 46 | −12 | 260 | 55 | 436 | 536 | 72 | 388 | No | — | 0.6 |
| I-2 | 770 | 368 | 50 | 0.00 | 23 | 17 | 103 | 23 | 70 | 57 | 122 | 379 | 555 | 247 | Yes | 461 | 0.9 |
| J-2 | 884 | 58 | 37 | 0.00 | 80 | 4 | 34 | −10 | 57 | 15 | 162 | 469 | 502 | 353 | Yes | 473 | 0.2 |
| K-2 | 760 | 206 | 44 | 0.00 | 31 | −8 | 91 | −5 | 361 | 45 | 237 | 466 | 89 | 296 | Yes | 454 | 0.7 |
| L-2 | 838 | 440 | 117 | 0.00 | 54 | 5 | 132 | −4 | 180 | 27 | 224 | 460 | 370 | 208 | Yes | 465 | 0.3 |
| M-2 | 777 | 285 | 26 | 0.00 | 10 | −4 | 43 | 8 | 164 | 28 | 518 | 504 | 67 | 380 | Yes | 457 | 0.8 |
| N-2 | 800 | 463 | 35 | 0.00 | 81 | −2 | 144 | −27 | 242 | 40 | 249 | 420 | 110 | 318 | Yes | 467 | 0.4 |
| O-2 | 842 | 493 | 23 | 0.00 | 85 | 0 | 58 | 5 | 79 | 59 | 180 | 476 | 179 | 186 | No | — | 0.2 |
| P-2 | 752 | 537 | 27 | 0.00 | 20 | 7 | 83 | 13 | 267 | 12 | 203 | 382 | 562 | 347 | No | — | 1.0 |
| Q-2 | 938 | 600 | 50 | 0.00 | 14 | −17 | 57 | 15 | 82 | 92 | 327 | 407 | 520 | 214 | No | — | 0.3 |
| R-2 | 919 | 496 | 88 | 0.00 | 66 | −17 | 125 | −16 | 60 | 72 | 276 | 431 | 372 | 308 | Yes | 484 | 0.6 |
| S-2 | 932 | 146 | 12 | 0.00 | 50 | 27 | 118 | −11 | 210 | 5 | 229 | 463 | 327 | 286 | No | — | 0.8 |
| T-2 | 906 | 481 | 63 | 0.00 | 70 | −12 | 64 | −17 | 216 | 61 | 239 | 518 | 560 | 323 | No | — | 0.2 |

Underlines indicate outside scope of present invention.

TABLE 3-2

| No. | Finish rolling completion temp. (°C.) | Coiling temp. (°C.) | Am't of removal of steel sheet surface layer (μm) | Thickness of internal oxide layer before cold rolling (μm) | Cold rolling reduction (%) | Cold rolled annealing 200 to 400° C. Dew point (° C.) | Cold rolled annealing 200 to 400° C. Holding time (s) | 740 to 900° C. Dew point (° C.) | 740 to 900° C. Holding time (s) | Average cooling rate from 750° C. to 550° C. (° C./s) | Cooling stop temp. (° C.) | Dwell temp. (° C.) | Dwell time (s) | Tempering (° C.) | Plating | Holding temp. after dipping in plating bath (° C.) | Skin pass rolling reduction (%) |
|---|---|---|---|---|---|---|---|---|---|---|---|---|---|---|---|---|---|
| A-3 | 759 | 212 | 10 | 0.00 | 65 | −8 | 128 | −6 | 141 | 96 | 289 | 365 | 304 | 200 | Yes | 485 | 0.9 |
| B-3 | 706 | 91 | 91 | 0.00 | 22 | 11 | 176 | −2 | 127 | 77 | 467 | 453 | 195 | 232 | No | — | 0.7 |
| C-3 | 905 | 354 | 53 | 0.00 | 75 | −7 | 127 | 1 | 236 | 80 | 205 | 374 | 489 | 356 | No | — | 0.5 |
| D-3 | 735 | 105 | 25 | 0.00 | 35 | 16 | 102 | −4 | 274 | 90 | 438 | 432 | 101 | 333 | Yes | 477 | 0.3 |
| E-3 | 753 | 550 | 88 | 0.00 | 27 | 6 | 32 | 15 | 222 | 24 | 141 | 411 | 211 | 291 | Yes | 486 | 0.7 |
| F-3 | 882 | 218 | 99 | 0.00 | 27 | 16 | 111 | −13 | 49 | 28 | 116 | 486 | 353 | 315 | No | — | 0.4 |
| G-3 | 847 | 270 | 80 | 0.00 | 38 | −3 | <u>204</u> | −6 | 56 | 87 | 463 | 390 | 94 | 211 | Yes | 464 | 0.3 |
| H-3 | 781 | 404 | 38 | 0.00 | 63 | −8 | <u>82</u> | 18 | 143 | 8 | 424 | 455 | 207 | 265 | Yes | 475 | 0.5 |
| I-3 | 801 | 216 | 24 | 0.00 | 44 | <u>25</u> | 87 | −18 | 217 | 71 | 49 | 416 | 379 | 177 | Yes | 471 | 0.4 |
| J-3 | 805 | 385 | 37 | 0.00 | 20 | 7 | 52 | −1 | 296 | 33 | 515 | 444 | 253 | 266 | No | — | 0.2 |
| K-3 | 880 | 480 | 43 | 0.00 | 63 | 17 | 40 | 12 | 247 | 16 | 324 | 370 | 290 | 180 | No | — | 1.0 |
| L-3 | 751 | 253 | 71 | 0.00 | 30 | −11 | 157 | −13 | 148 | 68 | 296 | 395 | 220 | 298 | Yes | 479 | 0.7 |
| M-3 | 757 | 317 | 72 | 0.00 | 41 | −16 | 90 | −16 | 123 | 62 | 382 | 528 | 492 | 157 | No | — | 0.9 |
| N-3 | 939 | 53 | 67 | 0.00 | 40 | −3 | 145 | −16 | 97 | 8 | 476 | 366 | 436 | 325 | Yes | 457 | 0.2 |
| O-3 | 852 | 260 | <u>3</u> | 0.14 | 29 | 2 | 164 | −16 | 147 | 83 | 111 | 377 | 547 | 335 | No | — | 0.2 |
| P-3 | 738 | 492 | <u>70</u> | 0.00 | 9 | 0 | 104 | −9 | 271 | 23 | 288 | 521 | 515 | 357 | Yes | 483 | 0.7 |
| Q-3 | 772 | 455 | 69 | 0.00 | 74 | −6 | 72 | 9 | 178 | 61 | 101 | 522 | 478 | 326 | No | — | 0.6 |
| R-3 | 905 | 102 | 18 | 0.00 | 54 | 17 | <u>17</u> | −12 | 118 | 42 | 456 | 525 | 234 | 289 | No | — | 0.2 |
| S-3 | 878 | 418 | 59 | 0.00 | 60 | 1 | <u>155</u> | 5 | 94 | 53 | 323 | 489 | 224 | 227 | No | — | 0.6 |
| T-3 | 825 | 161 | 20 | 0.00 | 87 | −14 | 45 | 18 | 198 | 71 | 490 | 392 | 447 | 237 | Yes | 487 | 0.8 |

Underlines indicate outside scope of present invention.

TABLE 3-3

| No. | Finish rolling completion temp. (°C.) | Coiling temp. (°C.) | Am't of removal of steel sheet surface layer (μm) | Thickness of internal oxide layer before cold rolling (μm) | Cold rolling reduction (%) | Cold rolled annealing 200 to 400° C. Dew point (° C.) | Cold rolled annealing 200 to 400° C. Holding time (s) | 740 to 900° C. Dew point (° C.) | 740 to 900° C. Holding time (s) | Average cooling rate from 750° C. to 550° C. (° C./s) | Cooling stop temp. (° C.) | Dwell temp. (° C.) | Dwell time (s) | Tempering (° C.) | Plating | Holding temp. after dipping in plating bath (° C.) | Skin pass rolling reduction (%) |
|---|---|---|---|---|---|---|---|---|---|---|---|---|---|---|---|---|---|
| A-4 | 791 | 253 | 39 | 0.00 | 16 | −14 | 171 | 1 | <u>327</u> | 10 | 446 | 452 | 155 | 228 | No | — | 0.6 |
| B-4 | 809 | 349 | 33 | 0.00 | 76 | 8 | 76 | −4 | <u>200</u> | 66 | 358 | 538 | 516 | 162 | Yes | 468 | 0.3 |
| C-4 | 746 | <u>611</u> | 82 | 0.00 | 74 | 4 | 107 | −8 | 226 | 18 | 249 | 396 | 101 | 272 | Yes | 465 | 0.5 |
| D-4 | 751 | 128 | 96 | 0.00 | 44 | 11 | 119 | 14 | 166 | 35 | 188 | 497 | 86 | 396 | No | — | 0.5 |
| E-4 | 939 | 132 | 113 | 0.00 | 67 | 10 | 146 | −14 | 110 | 86 | 300 | 362 | 434 | 199 | Yes | 465 | 0.3 |
| F-4 | 811 | 546 | 89 | 0.00 | 11 | 18 | 68 | 7 | 120 | 78 | 52 | 411 | 265 | 361 | Yes | 482 | 0.5 |
| G-4 | 740 | 533 | 36 | 0.00 | 51 | 14 | 30 | 2 | 246 | 53 | 35 | 539 | 161 | 368 | Yes | 452 | 0.6 |
| H-4 | 837 | 72 | 93 | 0.00 | 86 | 3 | <u>12</u> | 4 | 74 | 18 | 408 | 489 | 153 | 222 | No | — | 0.4 |
| I-4 | 864 | 77 | 34 | 0.00 | 71 | −9 | <u>131</u> | −4 | 218 | 30 | 534 | 479 | 518 | 373 | No | — | 0.3 |
| J-4 | 847 | 280 | <u>2</u> | 0.20 | 75 | −5 | 161 | −1 | 103 | 69 | 344 | 541 | 124 | 274 | No | — | 0.6 |
| K-4 | 940 | 284 | <u>52</u> | 0.00 | 48 | 13 | 143 | −7 | 161 | 43 | 445 | 487 | 57 | 264 | Yes | 476 | 0.8 |
| L-4 | 759 | 368 | 27 | 0.00 | 24 | −18 | 72 | 13 | 86 | 96 | 205 | 363 | 557 | 237 | No | — | 0.4 |
| M-4 | 889 | 311 | 13 | 0.00 | 52 | <u>−31</u> | 96 | −9 | 153 | 89 | 479 | 510 | 309 | 190 | No | — | 0.9 |
| N-4 | 853 | 487 | 12 | 0.00 | 79 | <u>15</u> | 65 | 13 | 285 | 48 | 388 | 503 | 294 | 191 | No | — | 0.6 |
| O-4 | 865 | 341 | 78 | 0.00 | 11 | −5 | 57 | 9 | 137 | 94 | 159 | 377 | 50 | 171 | Yes | 468 | 1.0 |
| P-4 | 818 | 420 | 58 | 0.00 | 57 | −18 | 89 | <u>32</u> | 98 | 84 | 359 | 421 | 340 | 259 | Yes | 483 | 0.8 |
| Q-4 | 847 | 144 | 17 | 0.00 | 44 | −11 | 27 | 3 | 93 | 42 | 335 | 470 | 302 | 345 | Yes | 462 | 0.8 |
| R-4 | 711 | 194 | 79 | 0.00 | 81 | 1 | 148 | −2 | 116 | 45 | 143 | 473 | 267 | 221 | No | — | 0.4 |
| S-4 | 738 | 337 | 46 | 0.00 | 31 | −12 | <u>198</u> | 17 | 276 | 33 | 257 | 421 | 423 | 302 | No | — | 0.7 |
| T-4 | 876 | 132 | 79 | 0.00 | 19 | −6 | <u>143</u> | 12 | <u>18</u> | 80 | 64 | 406 | 210 | 386 | No | — | 0.4 |

Underlines indicate outside scope of present invention.

TABLE 3-4

| No. | Number density at 1 to 10 μm depth of precipitates having diameter of less than 0.1 μm (/μm²) | Amount of dissolved C at 10 to 60 μm depth (mass %) | TS (MPa) | t-El (%) | λ (%) | LME resistance | Remarks |
|---|---|---|---|---|---|---|---|
| A-2 | 132 | 0.09 | 1224 | 12.8 | 17.8 | OK | Ex. |
| B-2 | <u>8</u> | <u>0.21</u> | 1214 | 11.9 | 18.7 | NG | Comp. ex. |
| C-2 | 117 | <u>0.14</u> | 1413 | 10.3 | 20.3 | OK | Ex. |
| D-2 | <u>3</u> | <u>0.28</u> | 1426 | 11.5 | 18.3 | NG | Comp. ex. |
| E-2 | 130 | <u>0.07</u> | 1482 | 11.0 | 19.3 | OK | Ex. |
| F-2 | <u>6</u> | 0.12 | 1483 | 10.0 | 31.4 | NG | Comp. ex. |
| G-2 | <u>94</u> | 0.13 | 1566 | 9.1 | 27.2 | OK | Ex. |
| H-2 | 97 | 0.15 | 1570 | 11.2 | 22.2 | OK | Ex. |
| I-2 | <u>6</u> | 0.14 | 1771 | 8.4 | 27.1 | NG | Comp. ex. |
| J-2 | <u>88</u> | 0.10 | 1408 | 10.1 | 29.6 | OK | Ex. |
| K-2 | <u>5</u> | 0.10 | <u>1171</u> | 14.6 | 17.9 | NG | Comp. ex. |
| L-2 | <u>141</u> | 0.11 | <u>1517</u> | 11.2 | 26.0 | OK | Ex. |
| M-2 | 63 | 0.07 | 2203 | 7.1 | 10.5 | OK | Ex. |
| N-2 | <u>9</u> | <u>0.21</u> | 1322 | 11.7 | 26.3 | NG | Comp. ex. |
| O-2 | <u>82</u> | <u>0.04</u> | 1214 | 13.7 | 18.5 | OK | Ex. |
| P-2 | 129 | 0.09 | 1604 | 8.7 | 25.4 | OK | Ex. |
| Q-2 | 18 | <u>0.22</u> | 1631 | 4.6 | 31.6 | NG | Comp. ex. |
| R-2 | 52 | <u>0.03</u> | 1226 | 14.7 | 17.4 | OK | Ex. |
| S-2 | <u>5</u> | 0.14 | 1625 | 10.3 | 20.7 | NG | Comp. ex. |
| T-2 | <u>41</u> | 0.07 | 1729 | 8.6 | 30.3 | OK | Ex. |

Underlines indicate outside scope of present invention.

TABLE 3-5

| No. | Number density at 1 to 10 μm depth of precipitates having diameter of less than 0.1 μm (/μm²) | Amount of dissolved C at 10 to 60 μm depth (mass %) | TS (MPa) | t-El (%) | λ (%) | LME resistance | Remarks |
|---|---|---|---|---|---|---|---|
| A-3 | 143 | 0.09 | 1255 | 12.5 | 18.6 | OK | Ex. |
| B-3 | 102 | 0.14 | 1323 | 11.1 | 21.9 | OK | Ex. |
| C-3 | 63 | 0.04 | 1216 | 11.7 | 17.9 | OK | Ex. |
| D-3 | 30 | 0.09 | 1821 | 9.1 | 20.9 | OK | Ex. |
| E-3 | 124 | 0.13 | 1312 | 12.3 | 17.4 | OK | Ex. |
| F-3 | 96 | 0.05 | 1304 | 11.1 | 23.0 | OK | Ex. |
| G-3 | <u>6</u> | 0.13 | 1834 | 8.0 | 29.9 | NG | Comp. ex. |
| H-3 | <u>135</u> | 0.14 | 1463 | 11.8 | 19.7 | OK | Ex. |
| I-3 | <u>4</u> | 0.03 | 1805 | 8.3 | 27.0 | NG | Comp. ex. |
| J-3 | <u>127</u> | 0.05 | 1556 | 9.3 | 36.7 | OK | Ex. |
| K-3 | 121 | 0.06 | 1253 | 13.5 | 17.1 | OK | Ex. |
| L-3 | 32 | 0.14 | 1538 | 11.3 | 19.8 | OK | Ex. |
| M-3 | 25 | 0.10 | 2232 | 7.0 | 18.6 | OK | Ex. |
| N-3 | 21 | 0.04 | 1428 | 11.0 | 30.2 | OK | Ex. |
| O-3 | <u>9</u> | 0.04 | 1235 | 13.5 | 9.0 | NG | Comp. ex. |
| P-3 | <u>118</u> | 0.05 | 2040 | 7.2 | 18.6 | OK | Ex. |
| Q-3 | 65 | 0.06 | 1592 | 9.8 | 29.2 | OK | Ex. |
| R-3 | <u>8</u> | 0.13 | 1228 | 14.9 | 17.4 | NG | Comp. ex. |
| S-3 | <u>47</u> | 0.12 | 1933 | 8.9 | 23.2 | OK | Ex. |
| T-3 | 55 | 0.10 | 1878 | 8.1 | 28.0 | OK | Ex. |

Underlines indicate outside scope of present invention.

TABLE 3-6

| No. | Number density at 1 to 10 μm depth of precipitates having diameter of less than 0.1 μm (/μm²) | Amount of dissolved C at 10 to 60 μm depth (mass %) | TS (MPa) | t-El (%) | λ (%) | LME resistance | Remarks |
|---|---|---|---|---|---|---|---|
| A-4 | <u>7</u> | 0.10 | <u>1104</u> | 14.2 | 17.3 | NG | Comp. ex. |
| B-4 | <u>135</u> | 0.07 | <u>1257</u> | 11.6 | 21.7 | OK | Ex. |
| C-4 | 144 | <u>0.24</u> | 1392 | 4.3 | 22.0 | NG | Comp. ex. |
| D-4 | 77 | <u>0.10</u> | 1532 | 10.8 | 18.4 | OK | Ex. |
| E-4 | 70 | 0.05 | 1337 | 12.2 | 17.3 | OK | Ex. |
| F-4 | 141 | 0.14 | 1454 | 10.1 | 30.0 | OK | Ex. |
| G-4 | 29 | 0.13 | 1542 | 9.2 | 26.4 | OK | Ex. |

TABLE 3-6-continued

| No. | Number density at 1 to 10 μm depth of precipitates having diameter of less than 0.1 μm (/μm²) | Amount of dissolved C at 10 to 60 μm depth (mass %) | TS (MPa) | t-El (%) | λ (%) | LME resistance | Remarks |
|---|---|---|---|---|---|---|---|
| H-4 | 3 | 0.07 | 1506 | 11.6 | 20.7 | NG | Comp. ex. |
| I-4 | 23 | 0.07 | 1659 | 8.8 | 26.1 | OK | Ex. |
| J-4 | 5 | 0.04 | 1581 | 9.2 | 4.2 | NG | Comp. ex. |
| K-4 | 142 | 0.06 | 1236 | 13.7 | 17.2 | OK | Ex. |
| L-4 | 107 | 0.09 | 1345 | 13.0 | 17.1 | OK | Ex. |
| M-4 | 6 | 0.13 | 2239 | 7.0 | 8.0 | NG | Comp. ex. |
| N-4 | 138 | 0.04 | 1438 | 10.9 | 30.9 | OK | Ex. |
| O-4 | 76 | 0.04 | 1253 | 13.3 | 19.6 | OK | Ex. |
| P-4 | 3 | 0.05 | 2034 | 7.2 | 18.8 | NG | Comp. ex. |
| Q-4 | 90 | 0.05 | 1492 | 10.3 | 27.6 | OK | Ex. |
| R-4 | 77 | 0.06 | 1247 | 15.5 | 17.9 | OK | Ex. |
| S-4 | 4 | 0.12 | 1975 | 8.8 | 20.8 | NG | Comp. ex. |
| T-4 | 3 | 0.22 | 1826 | 8.2 | 28.9 | NG | Comp. ex. |

Underlines indicate outside scope of present invention.

Referring to Tables 3, Examples B-2 and N-2 had low dew points in the temperature region of 740 to 900° C. in the cold rolled annealing, therefore precipitates could not be sufficiently made to form at the steel sheet surface layer. Further, it was not possible to sufficiently reduce the amount of dissolved C in the depth region of 10 to 60 μm from the steel sheet surface. As a result, the LME resistances fell. Examples D-2 and T-4 had short holding times in the temperature region of 740 to 900° C. in the cold rolled annealing, therefore similarly precipitates could not be made to sufficiently form at the steel sheet surface layer. Further, it was not possible to sufficiently reduce the amount of dissolved C in the depth region of 10 to 60 μm from the steel sheet surface. As a result, the LME resistances fell. Examples F-2 and M-4 had low dew points at the temperature region of 200 to 400° C. in the cold rolled annealing, therefore it was not possible to make precipitates sufficiently form at the steel sheet surface layer and the LME resistance fell. Examples I-2 and P-4 had high dew points in in the temperature region of 740 to 900° C. in the cold rolled annealing, therefore the precipitates of the steel sheet surface layer coarsened, the number density became smaller, and the LME resistance fell. Examples K-2 and A-4 had long holding times in the temperature region of 740 to 900° C. in the cold rolled annealing, therefore similarly the precipitates of the steel sheet surface layer coarsened, the number density became smaller, and the LME resistance fell.

Examples Q-2 and C-4 had high coiling temperatures, therefore sufficient gradient of the characteristics could not be imparted to the surface layer structure of the steel sheet and LME resistance fell. Examples S-2 and I-3 had high dew points at the the temperature region of 200 to 400° C. in the cold rolled annealing, therefore the precipitates of the steel sheet surface layer coarsened, the number density became smaller, and the LME resistance fell. Examples G-3 and S-4 had long holding times at the temperature region of 200 to 400° C. in the cold rolled annealing, therefore similarly the precipitates of the steel sheet surface layer coarsened, the number density became smaller, and the LME resistance fell. Examples O-3 and J-4 had small amounts of removal of the steel sheet surface layer due to pickling was small, therefore the precipitates at the steel sheet surface layer coarsened and sufficient gradient of the characteristics could not be imparted to the surface layer structure of the steel sheet and LME resistance fell. It is believed that such coarsening of the precipitates is due to the fact that the amount of removal of the steel sheet surface layer was small, therefore the layer was not completely removed and oxygen was supplied from the internal oxides remaining at the steel sheet surface layer. Examples R-3 and H-4 had short holding times at the temperature region of 200 to 400° C. in the cold rolled annealing, therefore precipitates could not be made to sufficiently form at the steel sheet surface layer and the LME resistance fell.

In contrast to this, in all of the examples according to the present invention, by suitably controlling in particular the coiling temperature, the amount of removal of the steel sheet surface layer by the pickling, and the dew point and the holding time in a predetermined temperature region of the cold rolled annealing, it was possible to obtain a steel sheet having high strength and excellent LME resistance plus improved total elongation and hole expandability as well. Further, while not particularly shown in Tables 3, the amounts of dissolved C in the depth regions of 60 μm to ¼ thicknesses from the steel sheet surfaces in all examples were higher than the amounts of dissolved C in the depth regions of 10 to 60 μm from the steel sheet surfaces, more specifically, were 1.20 times or more the amounts of dissolved C in the depth regions of 10 to 60 μm from the steel sheet surface.

The invention claimed is:
1. A steel sheet having a chemical composition comprising, by mass %,
C: 0.20 to 0.40%,
Si: 0.01 to 2.00%,
Mn: 0.10% to 4.00%,
P: 0.0200% or less,
S: 0.0200% or less,
Al: 1.500% or less,
N: 0.0200% or less,
Ti: 0.005 to 0.500%,
Co: 0 to 0.5000%,
Ni: 0 to 1.0000%,
Mo: 0 to 1.0000%,
Cr: 0 to 2.0000%,
O: 0 to 0.0200%,
B: 0 to 0.0100%,
Nb: 0 to 0.5000%,
V: 0 to 0.5000%,
Cu: 0 to 0.5000%,
W: 0 to 0.1000%,
Ta: 0 to 0.1000%,

Sn: 0 to 0.0500%,
Sb: 0 to 0.0500%,
As: 0 to 0.0500%,
Mg: 0 to 0.0500%,
Ca: 0 to 0.0500%,
Y: 0 to 0.0500%,
Zr: 0 to 0.0500%,
La: 0 to 0.0500%,
Ce: 0 to 0.0500%, and
a balance of Fe and impurities,
wherein precipitates having a diameter of less than 0.1 μm are present in a number density of 10 to 200/μm² in a depth region of 1 to 10 μm from a surface,
an amount of dissolved C in a depth region of 10 to 60 μm from the surface is less than 0.20 mass %, and
a tensile strength is 1200 MPa or more.

2. The steel sheet according to claim 1 wherein the chemical composition comprises, by mass %, one or more selected from
Co: 0.0001 to 0.5000%,
Ni: 0.0001 to 1.0000%,
Mo: 0.0001 to 1.0000%,
Cr: 0.0001 to 2.0000%,
O: 0.0001 to 0.0200%,
B: 0.0001 to 0.0100%,
Nb: 0.0001 to 0.5000%,
V: 0.0001 to 0.5000%,
Cu: 0.0001 to 0.5000%,
W: 0.0001 to 0.1000%,
Ta: 0.0001 to 0.1000%,
Sn: 0.0001 to 0.0500%,
Sb: 0.0001 to 0.0500%,
As: 0.0001 to 0.0500%,
Mg: 0.0001 to 0.0500%,
Ca: 0.0001 to 0.0500%,
Y: 0.0001 to 0.0500%,
Zr: 0.0001 to 0.0500%,
La: 0.0001 to 0.0500%, and
Ce: 0.0001 to 0.0500%.

3. The steel sheet according to claim 2, wherein a plating layer containing zinc, aluminum, magnesium, an alloy comprising any combination thereof, or an alloy of at least one of these elements and iron is formed on at least one surface of the steel sheet.

4. A method for producing a steel sheet comprising
a step of hot rolling a steel slab having a chemical composition according to claim 2, then coiling it at 580° C. or less,
a step of pickling the obtained hot rolled steel sheet to remove oxide scale present on the surface of the hot rolled steel sheet and remove the surface layer of the hot rolled steel sheet down to at least 5 μm, and
a step of cold rolling the hot rolled steel sheet, then annealing it, wherein the annealing comprises holding the obtained cold rolled steel sheet in an atmosphere of a dew point of −20 to 20° C. at a temperature region of 200 to 400° C. for 20 to 180 seconds, then holding it in an atmosphere of a dew point of −20 to 20° C. at a temperature region of 740 to 900° C. for 45 to 300 seconds.

5. The steel sheet according to claim 1, wherein a plating layer containing zinc, aluminum, magnesium, an alloy comprising any combination thereof, or an alloy of at least one of these elements and iron is formed on at least one surface of the steel sheet.

6. A method for producing a steel sheet comprising
a step of hot rolling a steel slab having a chemical composition according to claim 1, then coiling it at 580° C. or less,
a step of pickling the obtained hot rolled steel sheet to remove oxide scale present on the surface of the hot rolled steel sheet and remove the surface layer of the hot rolled steel sheet down to at least 5 μm, and
a step of cold rolling the hot rolled steel sheet, then annealing it, wherein the annealing comprises holding the obtained cold rolled steel sheet in an atmosphere of a dew point of −20 to 20° C. at a temperature region of 200 to 400° C. for 20 to 180 seconds, then holding it in an atmosphere of a dew point of −20 to 20° C. at a temperature region of 740 to 900° C. for 45 to 300 seconds.

7. The method for producing the steel sheet according to claim 6, wherein, in the annealing, a plating layer containing zinc, aluminum, magnesium, an alloy comprising any combination thereof, or an alloy of at least one of these elements and iron is formed on at least one surface of the cold rolled steel sheet.

* * * * *